US012656808B2

(12) United States Patent
Hokuto et al.

(10) Patent No.: US 12,656,808 B2
(45) Date of Patent: Jun. 16, 2026

(54) PEDAL DEVICE

(71) Applicant: DENSO CORPORATION, Kariya-city (JP)

(72) Inventors: Daisuke Hokuto, Kariya-city (JP); Etsugo Yanagida, Kariya-city (JP); Yuki Matsunaga, Kariya-city (JP); Masashi Arao, Kariya-city (JP); Ryo Sano, Kariya-city (JP); Kengo Ito, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/909,341

(22) Filed: Oct. 8, 2024

(65) Prior Publication Data

US 2025/0028346 A1 Jan. 23, 2025

Related U.S. Application Data

(63) Continuation of application No. PCT/JP2023/016858, filed on Apr. 28, 2023.

(30) Foreign Application Priority Data

Apr. 29, 2022 (JP) ................................. 2022-075564

(51) Int. Cl.
| | |
|---|---|
| *G05G 5/03* | (2008.04) |
| *B60T 7/04* | (2006.01) |
| *G05G 1/44* | (2008.04) |

(52) U.S. Cl.
CPC ................... *G05G 5/03* (2013.01); *B60T 7/04* (2013.01); *G05G 1/44* (2013.01)

(58) Field of Classification Search
CPC .............. G05G 5/03; G05G 1/44; B60T 7/04
See application file for complete search history.

(56) References Cited

U.S. PATENT DOCUMENTS

| | | | |
|---|---|---|---|
| 6,745,642 B2 * | 6/2004 | Kumamoto | .............. G05G 1/30 74/513 |
| 12,459,467 B2 * | 11/2025 | Hokuto | .................... B60T 7/06 |

(Continued)

FOREIGN PATENT DOCUMENTS

| | | |
|---|---|---|
| JP | S49-127653 U | 11/1974 |
| JP | S6178321 U | 5/1986 |

(Continued)

OTHER PUBLICATIONS

U.S. Appl. No. 18/911,761 to Daisuke Hokuto, filed Oct. 10, 2024 (134 pages).

(Continued)

*Primary Examiner* — Thomas C Diaz
(74) *Attorney, Agent, or Firm* — Nixon & Vanderhye P.C.

(57) ABSTRACT

A pedal device includes: a pedal configured to rotate about a rotational axis; and a reaction force generator configured to generate a reaction force corresponding to an urging force generated by pressing operation of the pedal. The pedal includes an urging portion configured to transmit the urging force to the reaction force generator when the urging portion is rotated integrally with the pedal. The reaction force generator includes a linearly moving portion configured to move linearly in an extending direction of a central axis of the reaction force generator when the pressing operation is performed. The urging portion has an urging surface configured to urge a contact surface of the linearly moving portion. The urging portion is placed at a position where a virtual urging center passes through a virtual axis perpendicular line when the pedal is rotated within a predetermined rotational range.

6 Claims, 22 Drawing Sheets

(56)                  References Cited

U.S. PATENT DOCUMENTS

| | | | | |
|---|---|---|---|---|
| 2005/0082909 A1* | 4/2005 | Constantakis | ........ | B60T 8/3255 |
| | | | | 303/20 |
| 2005/0183538 A9* | 8/2005 | Furuta | .................... | G05G 1/445 |
| | | | | 74/560 |
| 2007/0034038 A1* | 2/2007 | Horie | ........................ | G05G 5/03 |
| | | | | 74/512 |
| 2011/0100153 A1* | 5/2011 | Kaijala | .................... | G05G 1/38 |
| | | | | 74/512 |
| 2014/0117602 A1 | 5/2014 | Jeon | | |
| 2018/0274998 A1 | 9/2018 | Sumi et al. | | |
| 2022/0297650 A1 | 9/2022 | Hokuto et al. | | |

FOREIGN PATENT DOCUMENTS

| | | | |
|---|---|---|---|
| JP | 2018165891 A | 10/2018 | |
| WO | 2018179741 A1 | 10/2018 | |

OTHER PUBLICATIONS

U.S. Appl. No. 18/909,781 to Makoto Shigematsu, filed Oct. 8, 2024
(118 pages).

* cited by examiner

PEDAL DEVICE

CROSS REFERENCE TO RELATED APPLICATIONS

This application is a continuation application of International Patent Application No. PCT/JP2023/016858 filed on Apr. 28, 2023, which designated the U.S. and claims the benefit of priority from Japanese Patent Application No. 2022-075564 filed on Apr. 29, 2022. The entire disclosures of all of the above applications are incorporated herein by reference.

TECHNICAL FIELD

The present disclosure relates to a pedal device.

BACKGROUND

Previously, there has been proposed a pedal force detection device that includes: a rod that is moved in a longitudinal direction of the rod by a pedal force applied to a foot pedal; a case that extends in the longitudinal direction of the rod; and a detection unit received in the case. The detection unit includes a strain generator, an actuator, a guide body, an intermediate rod, a strain sensing element and a resilient member.

In this pedal force detection device, the foot pedal and the rod are coupled together by a clevis pin. When the pedal is pressed and is rotated, the rod is urged by the foot pedal and is moved in the longitudinal direction of the rod. When the rod is moved in the longitudinal direction, the intermediate rod is urged by the rod and is thereby moved in the longitudinal direction of the rod in a state where the intermediate rod contacts an inner peripheral surface of the guide body.

SUMMARY

According to one aspect of the present disclosure, there is provided a pedal device that includes a housing, a pedal and a reaction force generator. The pedal is installed to the housing and is configured to rotate about a rotational axis within a predetermined rotational range in response to pressing operation of the pedal by a human driver. The reaction force generator is configured to generate a reaction force which corresponds to an urging force generated by the pressing operation of the pedal. The pedal includes an urging portion that is configured to transmit the urging force generated by the pressing operation of the pedal to the reaction force generator when the urging portion is rotated integrally with the pedal about the rotational axis. The reaction force generator includes a linearly moving portion that is configured to move linearly in an extending direction of a central axis of the reaction force generator when the pressing operation of the pedal is performed. The linearly moving portion has a contact surface that is configured to contact the urging portion. The urging portion has an urging surface that is configured to urge the contact surface. A virtual circle is defined to extend along the urging surface, and a center of the virtual circle is defined as a virtual urging center. A line, which passes through the rotational axis and is perpendicular to the extending direction of the central axis, is defined as a virtual axis perpendicular line. The urging portion is placed at a position where the virtual urging center passes through the virtual axis perpendicular line when the pedal is rotated within the predetermined rotational range.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
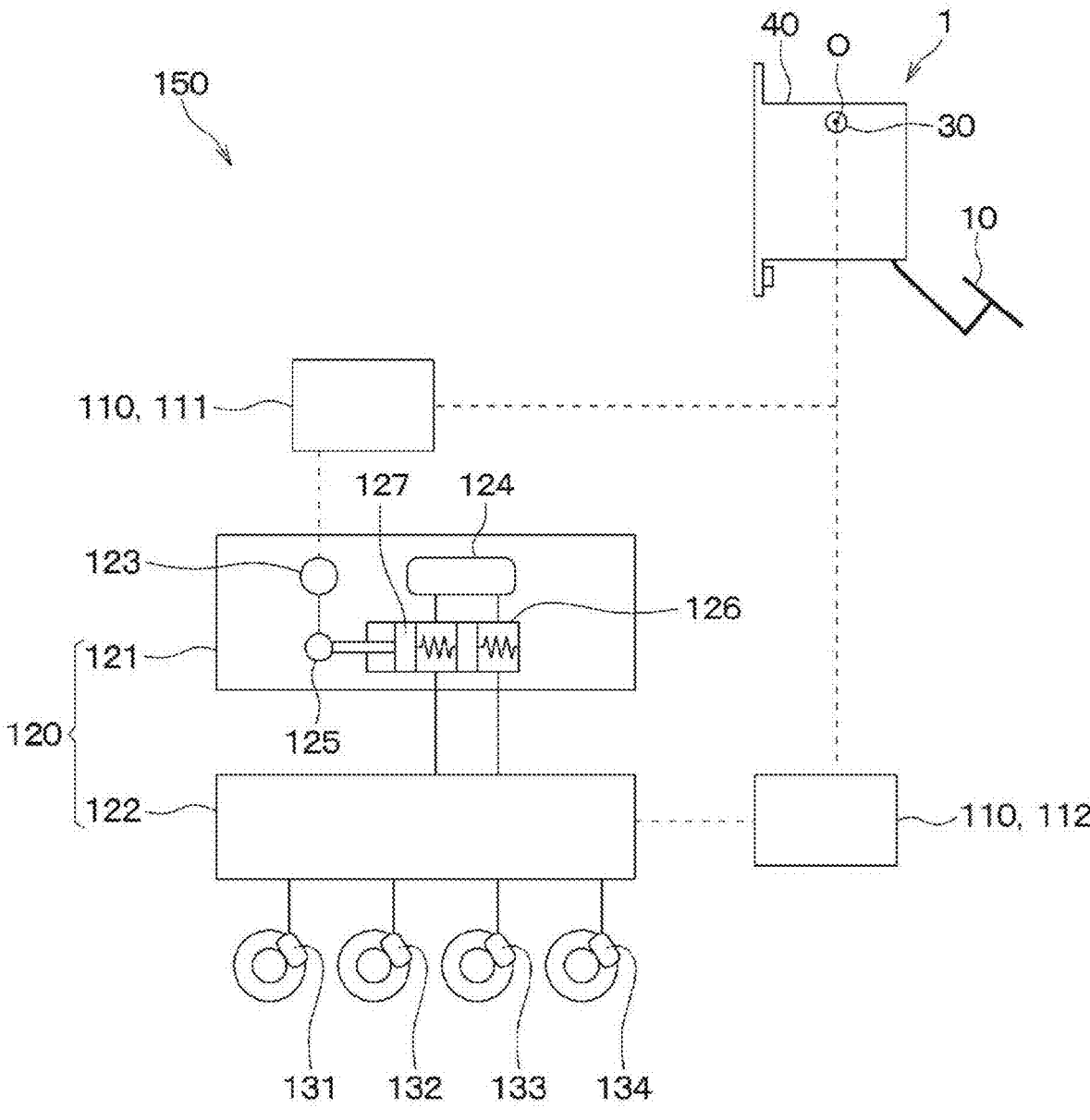
FIG. 1 is a schematic diagram of a brake-by-wire system in which a pedal device of a first embodiment is used.

Previously, there has been proposed a pedal force detection device that includes: a rod that is moved in a longitudinal direction of the rod by a pedal force applied to a foot pedal; a case that extends in the longitudinal direction of the rod; and a detection unit received in the case. The detection unit includes a strain generator, an actuator, a guide body, an intermediate rod, a strain sensing element and a resilient member.

In this pedal force detection device, the foot pedal and the rod are coupled together by a clevis pin. When the pedal is pressed and is rotated, the rod is urged by the foot pedal and is moved in the longitudinal direction of the rod. When the rod is moved in the longitudinal direction, the intermediate rod is urged by the rod and is thereby moved in the longitudinal direction of the rod in a state where the intermediate rod contacts an inner peripheral surface of the guide body.

Therefore, the resilient member is compressed by the intermediate rod, and an urging force generated by compression of the resilient member is applied to the actuator. Then, the actuator contacts the strain generator and resiliently deform the strain generator. The strain sensing element detects this resilient deformation of the strain generator. Furthermore, a reaction force, which is generated in response to the compression of the resilient member, is applied to the pedal. Hereinafter, the member, which generates the reaction force at the pedal, will also be referred to as a reaction force generator.

By the way, when the foot pedal is rotated from its initial position in a predetermined direction by being pressed by the pedal force, a position of the clevis pin, which couples between the foot pedal and the rod, is moved away from a central axis of the rod toward an upper side of the central axis.

When the rod urges the intermediate rod in the state where the position of the clevis pin is on the upper side of the central axis of the rod, the intermediate rod is urged in a direction inclined to the longitudinal direction of the rod. Then, when the intermediate rod is urged by the rod and is moved along the inner peripheral surface of the guide body, a lower surface of the inner peripheral surface of the guide body is urged against a lower surface of an outer peripheral surface of the intermediate rod to increase a frictional force generated between the outer peripheral surface of the intermediate rod and the inner peripheral surface of the guide body.

Therefore, a portion of the pedal force of the foot pedal is used to increase the frictional force. Thus, the reaction force to the foot pedal generated by the reaction force generator at the time of pressing the foot pedal becomes relatively small compared to a case where the frictional force is not increased. This causes the reaction force generated by the reaction force generator to deviate from a design value. In other words, if a load is generated on a member, which is configured to be linearly moved in a linear moving direction by the pedal force of the foot pedal, in a direction shifted from the linear moving direction, it causes the reaction force generated by the reaction force generator to deviate from its design value. The above-discussed point is found through the diligent study of the inventors of the present application.

According to one aspect of the present disclosure, there is provided a pedal device including:

a housing;

a pedal that is installed to the housing and is configured to rotate about a rotational axis within a predetermined rotational range in response to pressing operation of the pedal by a human driver; and a reaction force generator that is configured to generate a reaction force which corresponds to an urging force generated by the pressing operation of the pedal, wherein:

the pedal includes an urging portion that is configured to transmit the urging force generated by the pressing operation of the pedal to the reaction force generator when the urging portion is rotated integrally with the pedal about the rotational axis;

the reaction force generator includes a linearly moving portion that is configured to move linearly in an extending direction of a central axis of the reaction force generator when the pressing operation of the pedal is performed;

the linearly moving portion has a contact surface that is configured to contact the urging portion;

the urging portion has an urging surface that is configured to urge the contact surface;

a virtual circle is defined to extend along the urging surface, and a center of the virtual circle is defined as a virtual urging center;

a line, which passes through the rotational axis and is perpendicular to the extending direction of the central axis, is defined as a virtual axis perpendicular line; and the urging portion is placed at a position where the virtual urging center passes through the virtual axis perpendicular line when the pedal is rotated within the predetermined rotational range.

With the configuration described above, the amount of change in a position of a part of the urging surface, which contacts the contact surface, in a direction along the virtual axis perpendicular line can be made smaller in comparison to the case where the virtual urging center does not pass through the virtual axis perpendicular line at the time of rotating the pedal within the predetermined rotational range. Therefore, a direction (hereinafter referred to as a moving direction), in which the linearly moving portion is moved, is less likely to deviate from the extending direction of the central axis at the time of moving the linearly moving portion in response to the rotation of the pedal by the pressing operation of the pedal by the driver. Therefore, it is possible to limit the deviation of the reaction force, which is generated by the reaction force generator, from its design value.

Hereinafter, embodiments of the present disclosure will be described with reference to the drawings. In the following embodiments, the same reference signs may be assigned to portions that are the same as or equivalent to those described in the preceding embodiment(s), and the description thereof may be omitted. Furthermore, when only a portion of any one of the components is described in the embodiment, the description of the component described in the preceding embodiment can be applied to the rest of the component. The following embodiments may be partially combined with each other as long as the combination does not cause any trouble, even if not explicitly stated.

First Embodiment

The present embodiment will be described with reference to FIGS. 1 to 10. A pedal device 1 of the present embodiment is used, for example, as a brake pedal in a brake-by-wire system 150 that controls brakes of a vehicle. First, this brake-by-wire system 150 will be described.

As shown in FIG. 1, the brake-by-wire system 150 includes a plurality of wheel cylinders 131-134, a plurality of ECUs (electronic control units) 110, a brake circuit 120 and the pedal device 1.

The wheel cylinders 131-134 are provided to a plurality of wheels, respectively, of the vehicle. Brake pads, not shown, are attached to each wheel cylinder 131-134.

The ECUs 110 include a first ECU 111 and a second ECU 112. The first ECU 111 has a microcomputer and a drive circuit. The first ECU 111 controls a first brake circuit 121 of the brake circuit 120 described later based on a signal outputted from the pedal device 1 described below. The second ECU 112 has a microcomputer and a drive circuit. The second ECU 112 controls a second brake circuit 122 of the brake circuit 120 described later based on a signal outputted from the pedal device 1 described below.

The brake circuit 120 includes the first brake circuit 121 and the second brake circuit 122. The first brake circuit 121 includes a reservoir 124, an electric motor 123, a gear mechanism 125 and a master cylinder 126. The reservoir 124 stores a brake fluid. The electric motor 123 drives the gear mechanism 125. The gear mechanism 125 drives and reciprocates a master piston 127 of the master cylinder 126 in an axial direction of the master cylinder 126. The second brake circuit 122 includes solenoid valves (not shown). The second brake circuit 122 opens and closes a corresponding one of the solenoid valves according to a control signal outputted from the second ECU 112 to control a fluid pressure of each corresponding wheel cylinder 131-134.

Here, for the purpose of describing the pedal device 1, a front-rear direction of the vehicle will be referred to as a vehicle front-rear direction Da. A vertical direction of the vehicle will be referred to as a vehicle up-down direction Db. A left-right direction of the vehicle will be referred to as a vehicle left-right direction Dc. A front side in the vehicle front-rear direction Da will be referred to as a vehicle front side. A rear side in the vehicle front-rear direction Da will be referred to as a vehicle rear side. An upper side in the vehicle up-down direction Db will be referred to as a vehicle upper side. A lower side in the vehicle up-down direction Db will be referred to as a vehicle lower side.

Figure 2:
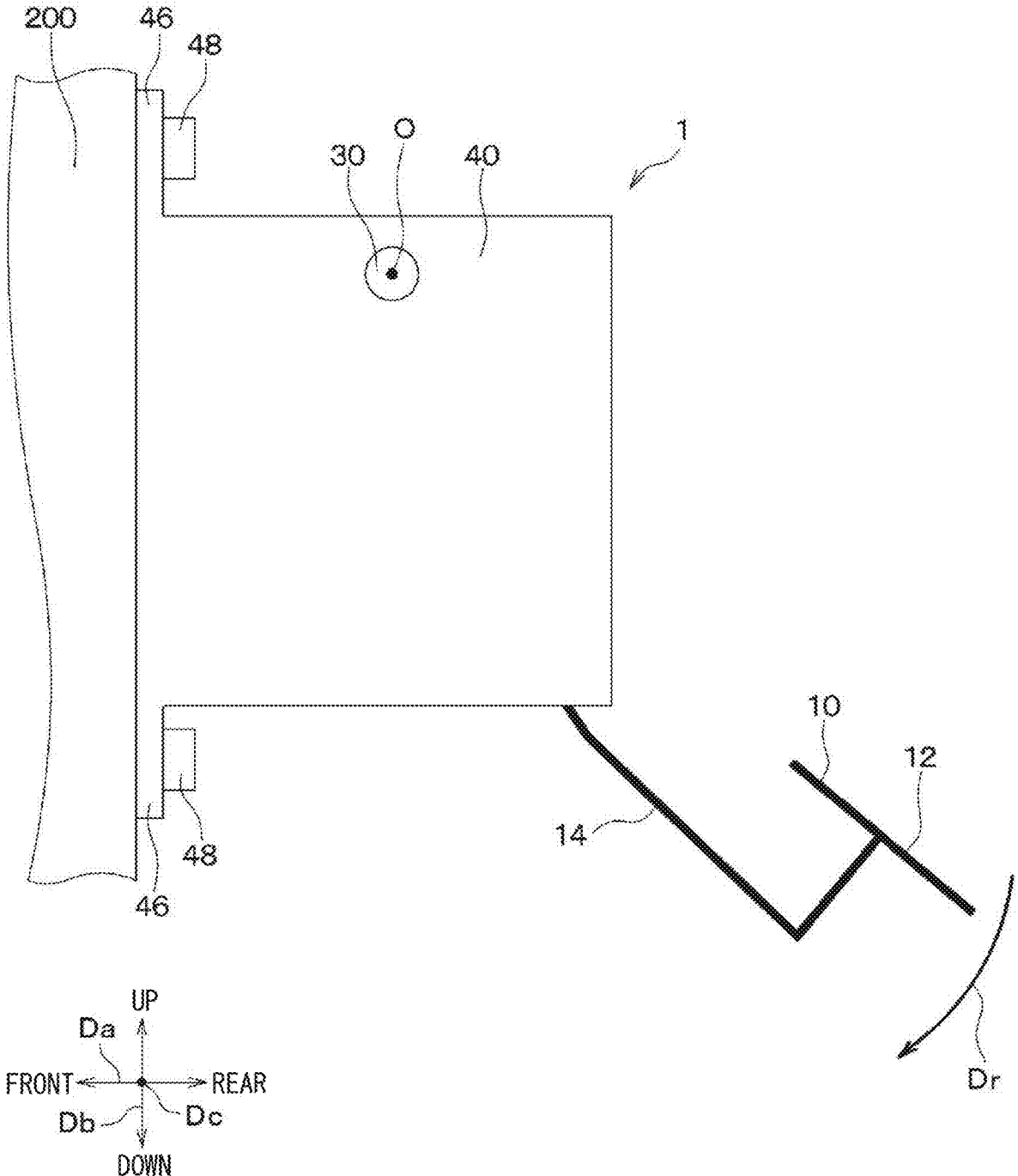
FIG. 2 is an external view of the pedal device of the first embodiment.
Figure 3:
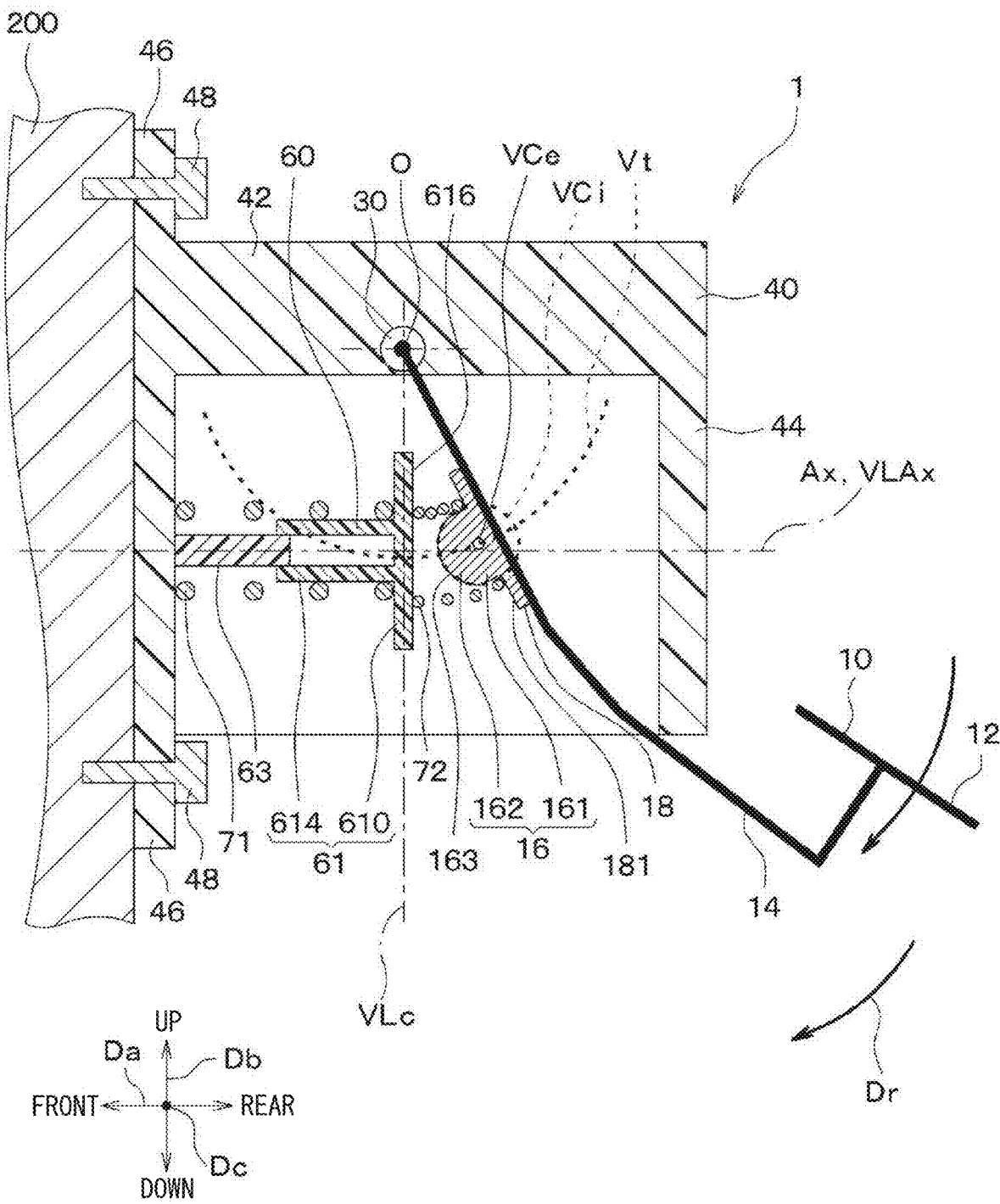
FIG. 3 is a cross-sectional view of the pedal device of the first embodiment.

As shown in FIGS. 2 and 3, the pedal device 1 includes a pedal 10, a stroke sensor 30, a housing 40 and a reaction force generating mechanism 60.

The pedal 10 is operated by a pressing operation of the pedal 10 by a human driver (hereinafter simply referred to as a driver) of the vehicle. Specifically, the pedal 10 includes a pedal portion 12, a lever portion 14, a lever projection 16 and a lever flange 18. The pedal portion 12 is where the driver places his or her foot. The lever portion 14 is coupled to the pedal portion 12. Furthermore, when the pedal portion 12 is pressed by the driver, the lever portion 14 is rotated about a rotational axis (an axis of a rotational shaft) O within a predetermined rotational range. The rotational axis O is set such that an axial direction of the rotational axis O extends along the vehicle left-right direction Dc. The lever projection 16 is coupled to a side of the lever portion 14, which faces the vehicle front side, and the lever projection 16 projects from a boundary between the lever portion 14 and the lever projection 16 toward the vehicle front side. Hereinafter, a direction in which the pedal 10 rotates when the pedal 10 is pressed by the driver will be referred to as a pedal rotational direction Dr.

The lever flange 18 is joined to the lever projection 16 and projects from a boundary between the lever projection 16 and the lever flange 18 in a direction perpendicular to a projecting direction of the lever projection 16. The lever flange 18 has a support surface 181 that supports a first resilient member 71 of the reaction force generating mechanism 60 described later. The support surface 181 changes a direction of its plate surface as shown in FIGS. 3 to 6 as the lever projection 16 is rotated integrally with the lever portion 14 in the pedal rotational direction Dr in response to the pressing operation of the pedal 10 by the driver.

At the time of rotating the pedal 10 in the pedal rotational direction Dr, the lever projection 16 is rotated integrally with the pedal 10 about the rotational axis O so that the lever projection 16 transmits a pedal force (pressing force), which is applied to the pedal 10 at the time of pressing the pedal 10 by the driver, to the reaction force generating mechanism 60. The lever projection 16 includes: a connecting portion 161 coupled to the side of the lever portion 14, which faces the vehicle front side; and an urging portion 162 which urges the reaction force generating mechanism 60.

The connecting portion 161 is shaped in a cylindrical form and extends from a plate surface of the lever portion 14, which faces the vehicle front side, in a direction perpendicular to the plate surface of the lever portion 14. The urging portion 162 is located on the opposite side of the connecting portion 161 opposite to the lever portion 14 and is joined to the connecting portion 161. The shape of the connecting portion 161 is not limited to the cylindrical form and may be any other suitable shape, such as a tubular form or a rectangular parallelepiped form, as long as it can be connected to the urging portion 162 and the lever portion 14.

The urging portion 162 is shaped substantially in a hemispherical form, and a part of the urging portion 162, which is opposite to a connecting part of the urging portion 162 connected to the connecting portion 161, is convex. The urging portion 162 is formed integrally with the connecting portion 161 in one-piece and is made of, for example, resin. The urging portion 162 has an urging surface 163 that urges the reaction force generating mechanism 60.

The urging surface 163 is shaped in a form of a curved surface that is bulged toward, i.e., is convex toward the reaction force generating mechanism 60. Specifically, the urging surface 163 is shaped in a form of a hemispherical surface that is convex toward the opposite side that is opposite to the lever portion 14. According to the present embodiment, the urging surface 163 is in the form of the curved surface that is convex toward the vehicle front side and the vehicle lower side in an initial pedal position, which is an initial position of the pedal 10 before being pressed by the driver. The shape of the urging portion 162 is not limited to the hemispherical form, but may be, for example, a half-cylinder shape produced by dividing a cylinder into two halves along a central axis of the cylinder, as long as the urging surface 163 can be formed into a curved surface that is convex toward the reaction force generating mechanism 60.

Figure 4:
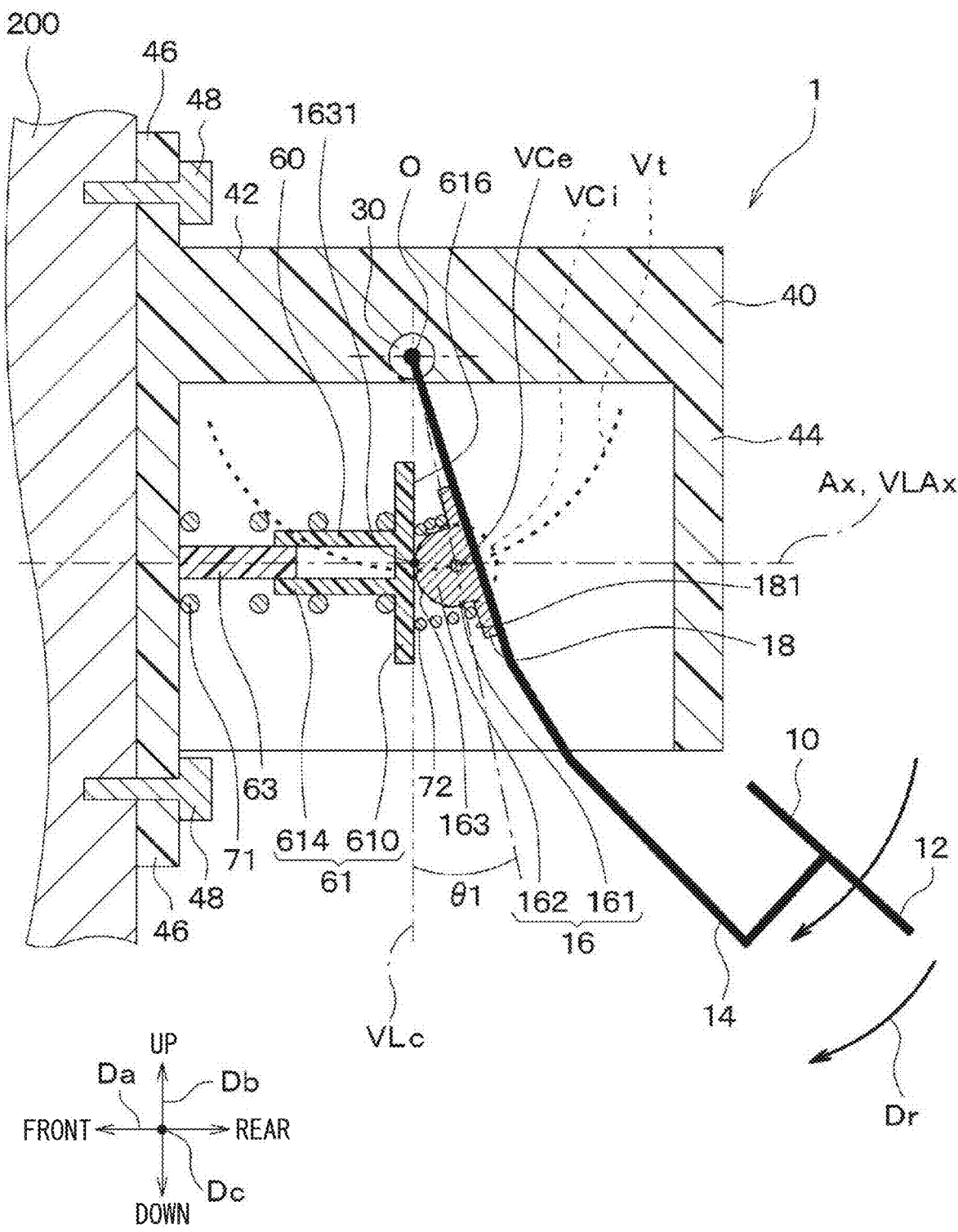
FIG. 4 is a cross-sectional view showing a state where the pedal device of the first embodiment is placed at a contact start position.
Figure 5:
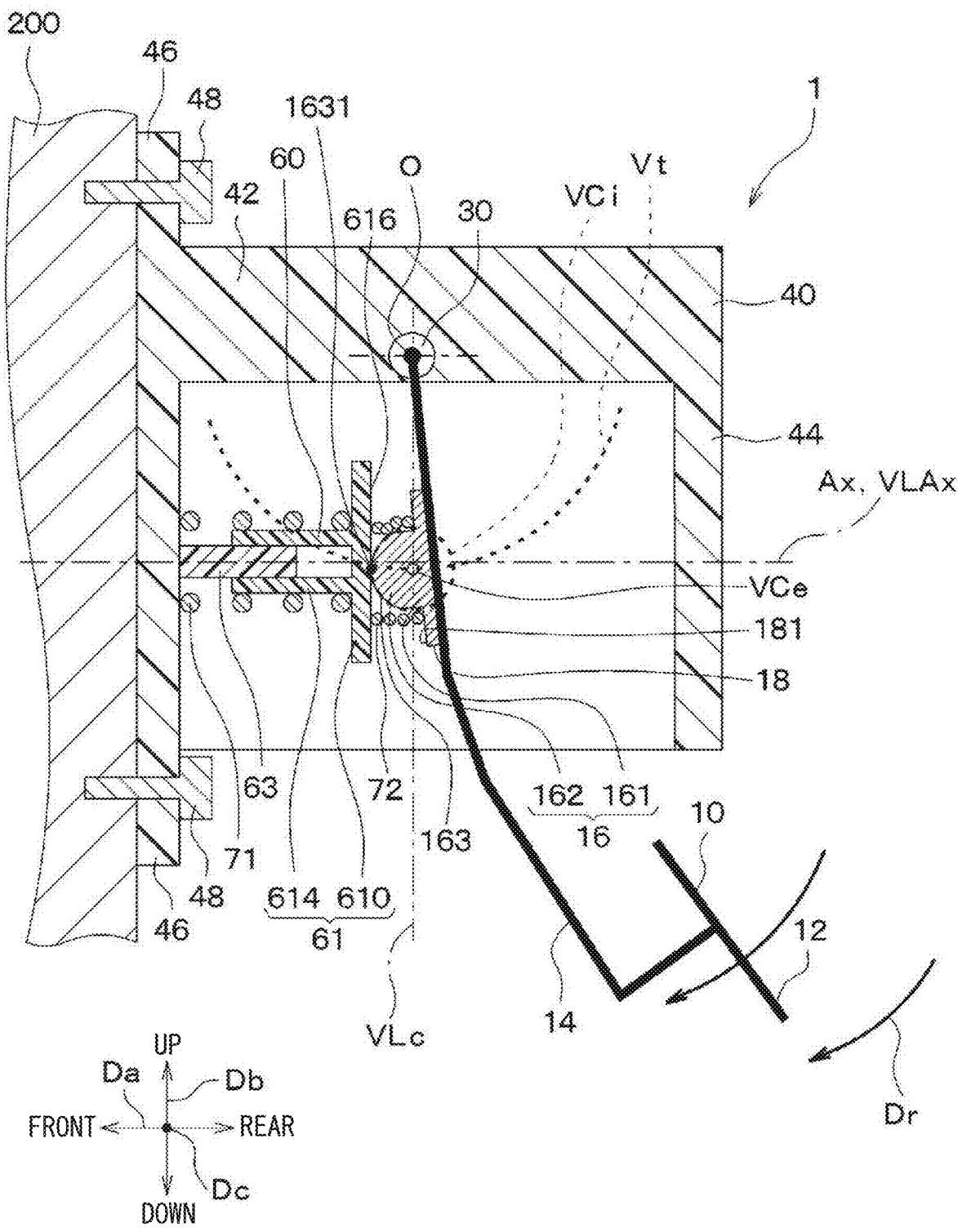
FIG. 5 is a cross-sectional view of the pedal device showing a state where the virtual urging center is placed at a lowest position that is lowest toward a vehicle lower side.
Figure 6:
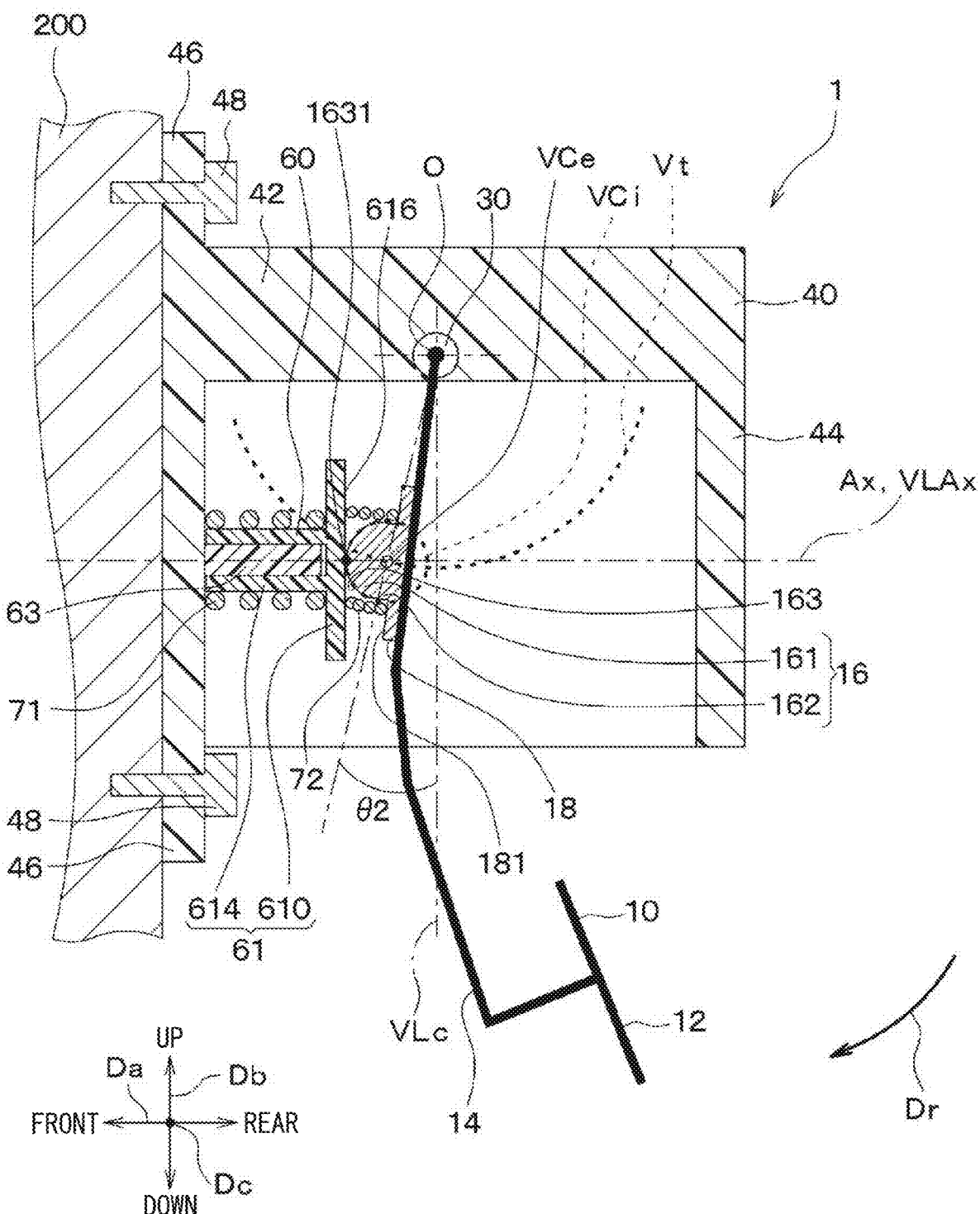
FIG. 6 is a cross-sectional view showing a state where the pedal device of the first embodiment is placed at a final pedal position.

As shown in FIGS. 3 to 6, a bulging direction of the urging surface 163, in which the urging surface 163 is bulged, changes as the lever projection 16 is rotated integrally with the lever portion 14 in the pedal rotational direction Dr in response to the pressing operation of the pedal 10 by the driver. In the present embodiment, the pedal 10 is configured to rotate within the range shown in FIGS. 3 to 6. FIG. 3 shows a state where the pedal 10 of the present embodiment is placed at the initial pedal position, and shows a state where the pedal 10 is positioned at an other-side rotational end at the time of rotating the pedal 10 within the predetermined rotational range. Furthermore, FIG. 6 shows a state where the pedal 10 of the present embodiment is placed at a final pedal position where the pedal 10 is pressed to the maximum extent by the driver, and shows a state where the pedal 10 is positioned at a one-side rotational end at the time of rotating the pedal 10 within the predetermined rotational range.

Here, as shown in, for example, FIG. 3, a virtual circle, which extends along the urging surface 163, is defined as a virtual urging circle VCi, and a center of the virtual urging circle VCi is defined as a virtual urging center VCe. Furthermore, a trajectory, along which the virtual urging center VCe passes when the lever projection 16 is rotated integrally with the pedal portion 12 in response to the pressing of the pedal 10 by the driver, is defined as a center trajectory Vt.

At the time of rotating the lever projection 16 in the pedal rotational direction Dr in response to the pressing of the pedal 10 by the driver, the virtual urging center VCe is rotated integrally with the pedal 10 about the rotational axis O, as shown in FIGS. 3 to 6. In a cross-section of the pedal device 1, which is perpendicular to the vehicle left-right direction Dc, the virtual urging center VCe is a center of a virtual circle which has an arc extending along the urging surface 163. The urging surface 163 of the present embodiment is formed such that the virtual urging circle VCi forms substantially a perfect circle.

Furthermore, in the present embodiment, a line, which passes through the rotational axis O and extends in the vehicle up-down direction Db, is defined as a virtual axis perpendicular line VLc. The urging portion 162 is positioned such that in the initial pedal position, the virtual urging center VCe is placed on the vehicle rear side of the virtual axis perpendicular line VLc. Specifically, the urging portion 162 is positioned such that in the initial pedal position, the virtual urging center VCe is placed on a counter rotational direction side of the virtual axis perpendicular line VLc which is opposite to the pedal rotational direction Dr side. When the lever projection 16 is rotated integrally with the pedal portion 12 in response to the pressing of the pedal 10 by the driver, the urging portion 162 is positioned such that the virtual urging center VCe is placed on the vehicle front side (i.e., the pedal rotational direction Dr side) of the virtual axis perpendicular line VLc.

The urging portion 162 of the present embodiment is configured such that when the pedal 10 is placed at the initial pedal position, the lever flange 18 is supported by the second resilient member 72 of the reaction force generating mechanism 60, and thereby the urging surface 163 does not contact the reaction force generating mechanism 60. Furthermore, the urging surface 163 is placed at a position where the urging surface 163 is in contact with the reaction force generating mechanism 60 when the lever projection 16 is rotated integrally with the pedal portion 12 in the pedal rotational direction Dr in response to the pressing of the pedal 10 by the driver.

As shown in FIG. 4, an angle θ1 is defined as an angle defined between a straight line passing through the rotational axis O and the virtual urging center VCe and the virtual axis perpendicular line VLc when the pedal 10 is rotated in the pedal rotational direction Dr and the urging surface 163 and the reaction force generating mechanism 60 make contact. Furthermore, as shown in FIG. 6, an angle θ2 is defined as an angle defined between the straight line passing through the rotational axis O and the virtual urging center VCe and the virtual axis perpendicular line VLc when the pedal 10 is placed in the final pedal position. The pedal 10 of the present embodiment is configured such that the angle θ1 and the angle θ2 are identical angles which are identical to each other. Specifically, at the time of rotating the pedal 10 within a contact range in which the urging surface 163 and the reaction force generating mechanism 60 are kept in contact with each other, the pedal 10 is rotatable up to the identical angle toward the one side with reference to the virtual axis perpendicular line VLc and is also rotatable up to the identical angle toward the other side opposite to the one side with reference to the virtual axis perpendicular line VLc. The details of the operation at the time of rotating the pedal 10 will be described later.

The stroke sensor 30 is positioned around, for example, the rotational shaft having the rotational axis O of the lever portion 14. The stroke sensor 30 includes a magnet, a yoke and a Hall element. Therefore, the stroke sensor 30 senses a rotational angle and a stroke amount of the pedal 10 by measuring a rotational angle of the lever portion 14. Furthermore, the stroke sensor 30 outputs a signal corresponding to the sensed rotational angle and the sensed stroke amount of the pedal 10 to the first ECU 111 and the second ECU 112. The stroke sensor 30 senses the rotational angle and the stroke amount of the pedal 10 by having the Hall element. However, the present disclosure is not limited to this configuration. The stroke sensor 30 may sense the rotational angle and the stroke amount of the pedal 10 by having, for example, an MR element. Here, MR stands for Magneto Resistive. Furthermore, the stroke amount is the amount of movement of the pedal portion 12 in the vehicle front-rear direction Da.

The housing 40 is mounted to a dash panel 200 of the vehicle and is shaped in a bottomed tubular form to receive a portion of the lever portion 14, the stroke sensor 30, and the reaction force generating mechanism 60 described below. The dash panel 200 is a partition wall which partitions between an outside (e.g., an engine compartment of the vehicle) of a vehicle cabin and an inside of the vehicle cabin, and the dash panel 200 is also sometimes referred to as a bulkhead. In addition to the vehicle's engine, for example, the vehicle's battery and an air conditioning system are also located at the outside of the vehicle cabin.

Specifically, the housing 40 has a housing bottom portion 42, a housing tubular portion 44, a panel mounting portion 46 and panel bolts 48.

The housing bottom portion 42 extends in the vehicle front-rear direction Da. The rotational shaft having the rotational axis O of the lever portion 14 and the stroke sensor 30 are installed to the housing bottom portion 42. The housing bottom portion 42 supports the portion of the lever portion 14 in a manner that enables the rotation of the lever portion 14 about the rotational axis O and also supports the stroke sensor 30.

The housing tubular portion 44 is connected to an end of the housing bottom portion 42 and extends downward from the end of the housing bottom portion 42 toward the vehicle lower side. Furthermore, the housing tubular portion 44 receives the portion of the lever portion 14, the stroke sensor 30 and the reaction force generating mechanism 60.

The panel mounting portion 46 is connected to a part of the housing bottom portion 42, which faces the vehicle front side and the vehicle upper side, and the panel mounting portion 46 extends from a boundary between the housing bottom portion 42 and the panel mounting portion 46 toward the vehicle upper side. The panel mounting portion 46 is connected to an end of the housing tubular portion 44, which faces the vehicle front side and the vehicle upper side, and the panel mounting portion 46 extends from a boundary between the housing tubular portion 44 and the panel mounting portion 46 toward the vehicle upper side. Holes are formed at the panel mounting portion 46, and the housing 40 is installed to the dash panel 200 by insertion of the panel bolts 48 into the holes of the panel mounting portion 46 and holes of the dash panel 200.

The reaction force generating mechanism 60 is a reaction force generator that generates the reaction force against the pedal force of the driver applied to the pedal portion 12.

Specifically, the reaction force generating mechanism 60 includes a holder 61, a guide member 63, the first resilient member 71 and a second resilient member 72.

The holder 61 is made of, for example, resin. Furthermore, the holder 61 includes a support portion 610 and a guide portion 614. Here, the holder 61 is made of the resin. However, the present disclosure is not limited to this. The holder 61 may be made of, for example, metal.

The support portion 610 is shaped in, for example, a thin circular plate form that has a plate thickness direction in the vehicle front-rear direction Da and extends in both the vehicle up-down direction Db and the vehicle left-right direction Dc. That is, a plate surface of the support portion 610 is perpendicular to the vehicle front-rear direction Da. The support portion 610 has a contact surface 616 that is formed at a side of the support portion 610 which faces the vehicle rear side, and the contact surface 616 is configured to be urged by the urging surface 163 of the lever projection 16. The contact surface 616 is shaped in, for example, a form of a planar surface that is perpendicular to the vehicle front-rear direction Da and extends in both of the vehicle up-down direction Db and the vehicle left-right direction Dc. Here, it should be noted that the shape of the support portion 610 is not limited to the thin circular plate form. As long as the contact surface 616 can be shaped in the form of the planar surface, the support portion 610 may not be in the plate form and may be in, for example, a rectangular parallelepiped form.

The guide portion 614 is shaped in a cylindrical tubular form and extends toward the vehicle front side from a surface of the support portion 610 which is opposite to the contact surface 616. A portion of the guide member 63 is inserted into an inside of the guide portion 614 shaped in the cylindrical tubular form. Thereby, the holder 61 is configured to be moved in an extending direction of the guide member 63. The holder 61 serves as a linearly moving portion.

The guide member 63 is made of metal and is shaped in a rod form that has a central axis Ax which extends in the vehicle front-rear direction Da. That is, the guide member 63 is formed along an extending direction of the central axis Ax. In the present embodiment, the extending direction of the central axis Ax coincides with the vehicle front-rear direction Da. Hereinafter, a virtual line, which extends along the central axis Ax, will also be referred to as a virtual axial line VLAx. The virtual axial line VLAx passes through the center trajectory Vt. Furthermore, the portion of the guide member 63 is inserted into the inside of the guide portion 614. Thereby, the relative movement between the guide member 63 and the guide portion 614 in the vehicle up-down direction Db and the vehicle left-right direction Dc is limited. Furthermore, since the guide member 63 and the guide portion 614 extend in the vehicle front-rear direction Da, an outer peripheral surface of the guide member 63 and an inner peripheral surface of the guide portion 614 slide relative to each other in the vehicle front-rear direction Da.

In this instance, the first resilient member 71 and the second resilient member 72 are connected in series. Here, the expression "the first resilient member 71 and the second resilient member 72 are connected in series" means that the first resilient member 71 and the second resilient member 72 exert the resilient force to the pedal 10 through a common transmission path.

Specifically, the first resilient member 71 is, for example, a coil spring and is configured to be resiliently deformed in the vehicle front-rear direction Da. Furthermore, the guide member 63 and the guide portion 614 are placed at an inside of the first resilient member 71. Thereby, movement of the first resilient member 71 in the vehicle up-down direction Db and the vehicle left-right direction Dc is limited. Furthermore, a front part of the first resilient member 71, which faces the vehicle front side, contacts and is thereby supported by the inner surface of the housing tubular portion 44 located on the vehicle front side, and a rear part of the first resilient member 71, which faces the vehicle rear side, contacts and is thereby supported by the surface of the support portion 610 which is opposite to the contact surface 616.

Furthermore, when the pedal portion 12 is not pressed by the driver, the first resilient member 71 is resiliently deformed and is compressed in this instance. Here, when the pedal portion 12 is not pressed by the driver, the first resilient member 71 is resiliently deformed. However, the present disclosure is not limited to this. That is, when the pedal portion 12 is not pressed by the driver, the first resilient member 71 may not be resiliently deformed. In this case, a length of the first resilient member 71 is a free length.

The second resilient member 72 is, for example, a coil spring and is configured to be resiliently deformed in the vehicle front-rear direction Da. The second resilient member 72 is placed between the holder 61 and the pedal 10. Furthermore, a front part of the second resilient member 72, which faces the vehicle front side, contacts and is thereby supported by the contact surface 616 of the support portion 610, and a rear part of the second resilient member 72, which faces the vehicle rear side, contacts and is thereby supported by the support surface 181 of the lever flange 18. In other words, the front part of the second resilient member 72, which is located on the one side in a deforming direction of the second resilient member 72 (i.e., a direction in which the second resilient member 72 is configured to deform), is supported by the contact surface 616, and the rear part of the second resilient member 72, which is located on the other side in the deforming direction of the second resilient member 72, is supported by the support surface 181.

Furthermore, the connecting portion 161 is placed at an inside of the second resilient member 72. The second resilient member 72 is in contact with an outer peripheral surface of the connecting portion 161. Furthermore, when the pedal portion 12 is not pressed by the driver, the second resilient member 72 is resiliently deformed and is compressed in this instance. Here, when the pedal portion 12 is not pressed by the driver, the second resilient member 72 is resiliently deformed. However, the present disclosure is not limited to this. That is, when the pedal portion 12 is not pressed by the driver, the second resilient member 72 may not be resiliently deformed. In this case, a length of the second resilient member 72 is a free length.

Furthermore, the second resilient member 72 forms a predetermined size of a gap between the contact surface 616 and the urging surface 163 when the pedal portion 12 is not pressed by the driver. That is, in the state where the pressing operation of the pedal 10 by the driver is released, the urging surface 163 and the contact surface 616 do not contact with each other.

The brake-by-wire system 150 is configured in the above-described manner. Next, the operation of the pedal device 1 will be described.

In the state where the pedal portion 12 is not pressed by the driver of the vehicle, the pedal 10 is placed at the initial pedal position. At this time, the virtual urging center VCe is placed on the vehicle rear side of the virtual axis perpendicular line VLc (i.e., the counter rotational direction side of the virtual axis perpendicular line VLc opposite to the pedal rotational direction Dr side). When the pedal portion 12 is pressed by the driver of the vehicle, the lever portion 14 is rotated integrally with the pedal portion 12 about the rotational axis O. Therefore, when the lever projection 16 is rotated integrally with the pedal portion 12 about the rotational axis O, the urging surface 163 contacts the contact surface 616, as shown in FIG. 4. The urging surface 163 and the contact surface 616 contact with each other in a state where the virtual urging center VCe is placed on the vehicle rear side of the virtual axis perpendicular line VLc. Hereinafter, a position of the pedal 10, at which the urging surface 163 comes in contact with the contact surface 616 through the rotation of the urging portion 162 integrally with the pedal portion 12, will also be referred to as a contact start position.

Furthermore, since the force outputted from the pedal portion 12 is transmitted to the second resilient member 72 through the lever flange 18, the second resilient member 72 is compressed. At the lever projection 16 of the present embodiment, a part of the urging surface 163, which contacts the contact surface 616 at the time of placing the pedal 10 in the contact start position, is positioned on the virtual axial line VLAx. In FIG. 4 and the drawings described later, the part of the urging surface 163, which contacts the contact surface 616, is indicated by a black circle. The part of the urging surface 163, which contacts the contact surface 616, will also be referred to as a contact part 1631.

When the pedal portion 12 is further rotated from the contact start position in the pedal rotational direction Dr by the pedal force of the driver, the urging surface 163 urges the contact surface 616, and thereby the force of the pedal portion 12 is transmitted to the holder 61. Thus, as shown in FIG. 5, the holder 61 is moved toward the vehicle front side in the vehicle front-rear direction Da. Therefore, the inner peripheral surface of the guide portion 614 slides along the outer peripheral surface of the guide member 63, and the first resilient member 71 is compressed by the support portion 610.

When the holder 61 is urged by the urging surface 163 and is thereby moved in the vehicle front-rear direction Da, the position of the contact part 1631 in the vehicle up-down direction Db is changed in response to the movement of the holder 61 and the lever projection 16. Specifically, the contact part 1631 is moved from the position shown in FIG. 4 toward the vehicle lower side of the virtual axial line VLAx. Furthermore, the position of the virtual urging center VCe is changed in response to the movement of the holder 61 and the lever projection 16. Specifically, the virtual urging center VCe is rotated along the center trajectory Vt in the pedal rotational direction Dr to move toward the virtual axis perpendicular line VLc.

Then, as shown in FIG. 5, when the virtual urging center VCe is rotated to a position where the virtual urging center VCe overlaps the virtual axis perpendicular line VLc, the contact part 1631 is placed at a position that is the farthest from the virtual axial line VLAx. That is, when the virtual urging center VCe is rotated to the position where the virtual urging center VCe overlaps the virtual axis perpendicular line VLc, the contact part 1631 is placed at the position that is farthest from the virtual axial line VLAx along the center trajectory Vt.

Furthermore, when the pedal portion 12 is further rotated by the pedal force of the driver, as shown in FIG. 6, the holder 61 is further moved toward the vehicle front side in the vehicle front-rear direction Da, and the first resilient member 71 is further compressed by the support portion 610. The contact part 1631 is moved toward the vehicle upper side to approach the virtual axial line VLAx in response to the movement of the holder 61 and the lever projection 16. Furthermore, in response to the movement of the holder 61 and the lever projection 16, the virtual urging center VCe is rotated along the center trajectory Vt in the pedal rotational direction Dr such that the virtual urging center VCe passes through the virtual axis perpendicular line VLc and moves away from the virtual axis perpendicular line VLc.

Then, when the pedal 10 is placed at the final pedal position, the rotation of the pedal 10 is limited. The contact part 1631 is positioned on the virtual axial line VLAx when the pedal 10 is placed at the final pedal position.

Furthermore, the first resilient member 71 and the second resilient member 72, which are compressed by the pedal force transmitted from the pedal portion 12, generate the reaction force by restoring forces thereof. With this reaction force, even when a mechanical connection between the pedal and the master cylinder 126 is eliminated, the pedal device 1 can obtain the same reaction force as the reaction force generated in a case where the pedal 10 is connected to the master cylinder 126, i.e., the reaction force generated by the hydraulic pressure.

At this time, the stroke sensor 30 senses the rotational angle and the stroke amount of the pedal portion 12 by measuring the rotational angle of the lever portion 14. Furthermore, the stroke sensor 30 outputs the sensed rotational angle and the sensed stroke amount of the pedal portion 12 to the first ECU 111 and the second ECU 112.

At this time, the first ECU 111 rotates the electric motor 123 by, for example, supplying the electric power to the electric motor 123. Therefore, the gear mechanism 125 is driven to move the master piston 127. Therefore, the fluid pressure of the brake fluid, which is supplied from the reservoir 124 to the master cylinder 126, is increased. The increased fluid pressure is supplied to the second brake circuit 122.

Furthermore, the second ECU 112 supplies the electric power to, for example, the solenoid valves of the second brake circuit 122. Therefore, the solenoid valves of the second brake circuit 122 are opened. Thus, the brake fluid, which is supplied to the second brake circuit 122, is supplied to each of the wheel cylinders 131-134. Thus, the brake pads, which are installed to each of the wheel cylinders 131-134, are frictionally engaged with the corresponding brake disc. Thereby, each of the wheels is braked, and the speed of the vehicle is reduced accordingly. At this time, the second ECU 112 may execute an ABS control operation, a VSC control operation, a collision avoidance control operation and a regenerative coordination control operation based on the signal from the stroke sensor 30 and a signal(s) from an undepicted electronic controller device(s). Here, ABS stands for Anti-lock Braking System. Furthermore, VSC stands for Vehicle Stability Control.

Then, when the driver of the vehicle stops the pressing of the pedal portion 12, the holder 61 is moved toward the vehicle rear side by the restoring forces of the first resilient member 71 and the second resilient member 72. Therefore, the inner peripheral surface of the guide portion 614 slides relative to the outer peripheral surface of the guide member 63 toward the vehicle rear side. Furthermore, the lever flange 18 is pushed backward by the restoring force of the second resilient member 72. Therefore, the pedal 10 is returned to the initial pedal position which is the position of the pedal 10 when the driver of the vehicle does not press the pedal portion 12.

As described above, in the pedal device 1 of the present embodiment, when the lever projection 16 is rotated integrally with the pedal 10 in the pedal rotational direction Dr by the pedal force of the driver, the virtual urging center VCe is moved from the counter rotational direction side of the virtual axis perpendicular line VLc, which is opposite to the pedal rotational direction Dr side, to the pedal rotational direction Dr side of the virtual axis perpendicular line VLc. The urging portion 162 is configured such that the virtual urging center VCe passes through the virtual axis perpendicular line VLc. The reason why the urging portion 162 is configured in this manner will be described with reference to FIGS. 7 and 8.

As discussed above, when the lever projection 16 is rotated integrally with the pedal portion 12 about the rotational axis O by the pedal force of the driver, the urging surface 163 of the urging portion 162 urges the contact surface 616, and thereby the pedal force is transmitted from the pedal portion 12 to the holder 61. Therefore, the holder 61 is moved toward the vehicle front side along the vehicle front-rear direction Da. Furthermore, the inner peripheral surface of the guide portion 614 slides along the outer peripheral surface of the guide member 63.

Figure 7:
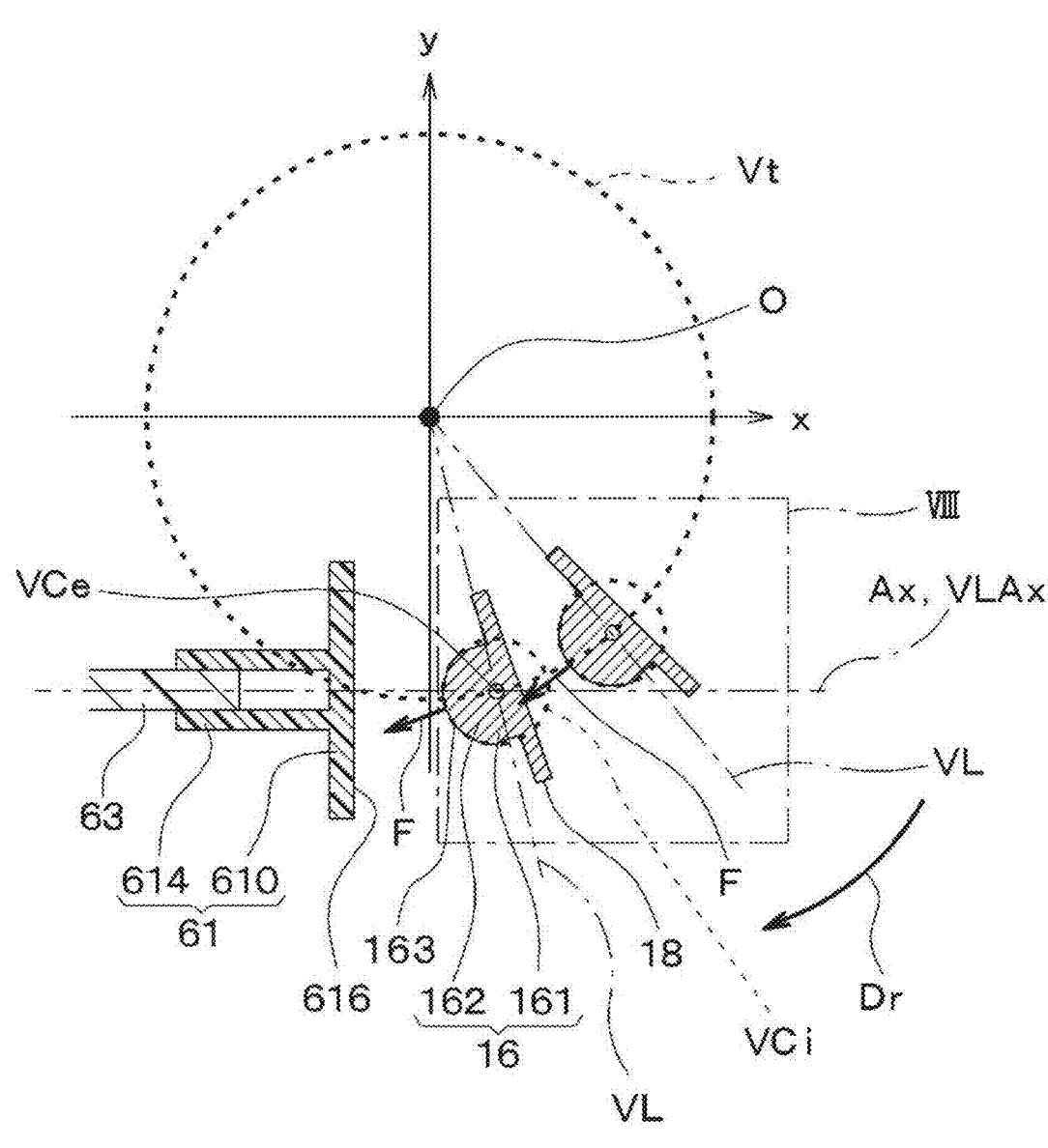
FIG. 7 is a schematic diagram showing a positional relationship of each of an urging portion, a holder and a guide member in x-y coordinates.
Figure 8:
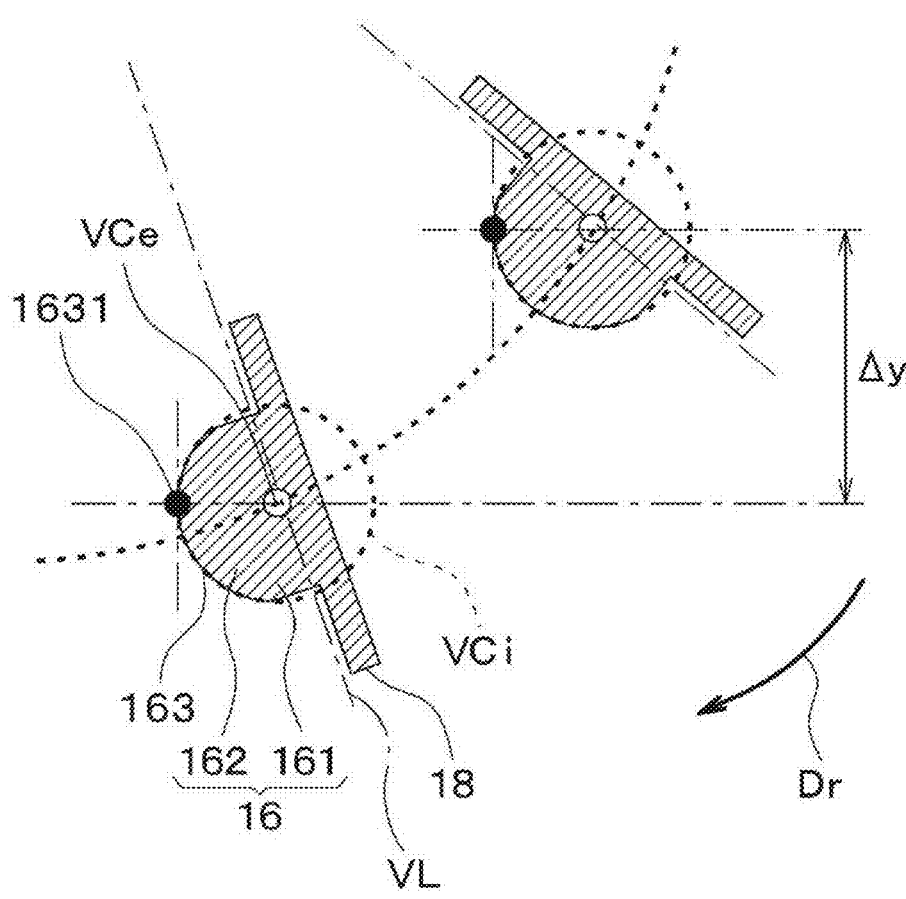
FIG. 8 is an enlarged view of a portion VIII in FIG. 7.

FIG. 7 is a schematic diagram showing a positional relationship of each of urging portion 162, the holder 61 and the guide member 63 in x-y coordinates. An axial direction (x-direction) along the x-axis shown in FIG. 7 coincides with an extending direction of the virtual axial line VLAx. Furthermore, an axial direction (y-direction) along the y-axis shown in FIG. 7 is a direction perpendicular to the extending direction of the virtual axial line VLAx and coincides with an extending direction of the virtual axis perpendicular line VLc. An origin in the x-y coordinates indicates the rotational axis O.

As shown in FIG. 7, in a case where a virtual straight line VL, which extends through the rotational axis O and the virtual urging center VCe, is inclined relative to the axial direction of the y-axis, a load direction F, which is at the time of rotating the urging portion 162 to urge the contact surface 616 by the urging surface 163 of the urging portion 162, is inclined relative to the vehicle front-rear direction Da toward the vehicle lower side. That is, the load, which is exerted at the time of urging the contact surface 616 by the urging surface 163, includes a load component in the x-direction and a load component in the y-direction.

Therefore, when the holder 61 is moved toward the vehicle front side in the vehicle front-rear direction Da, a vehicle lower side surface of the inner peripheral surface of the guide portion 614 is urged by a vehicle lower side surface of the outer peripheral surface of the guide member 63, and thereby a frictional force generated between the inner peripheral surface of the guide portion 614 and the outer peripheral surface of the guide member 63 is increased. The increase amount of the frictional force becomes larger as the load direction F at the time of urging the contact surface 616 by the urging surface 163 is more largely inclined relative to the vehicle front-rear direction Da. Furthermore, the load direction F at the time of urging the contact surface 616 by the urging surface 163 is more largely inclined relative to the vehicle front-rear direction Da as the position of the contact part 1631 at the time of urging the contact surface 616 by the urging surface 163 is moved away from the virtual axial line VLAx.

However, the increase in the frictional force causes deviation of the reaction force, which is obtained by compressing the first resilient member 71 and the second resilient member 72 by the pedal force applied to the pedal portion 12, from its design value. Therefore, it is desirable that the increase in the frictional force is limited. Thus, it is desirable that the urging surface 163 contacts the contact surface 616 in a state where the position of the contact part 1631 at the time of urging the contact surface 616 by the urging surface 163 is placed as close as possible to the virtual axial line VLAx.

In view of the above point, the inventors of the present application have examined ways of placing the contact part 1631 close to the virtual axial line VLAx at the time of contacting the urging surface 163 and the contact surface 616 with each other, and also limiting the amount of change in the position of the contact part 1631 in the direction along the virtual axis perpendicular line VLc at the time of contacting the urging surface 163 and the contact surface 616 with each other. The amount of change in the position of the contact part 1631 in the direction along the virtual axis perpendicular line VLc caused by the rotation of the urging portion 162 integrally with the pedal portion 12 in the pedal rotational direction Dr about the rotational axis O will be referred to as a contact change amount $\Delta y$.

Here, the urging surface 163 is shaped in the form of the curved surface that is convex toward the reaction force generating mechanism 60. Although the part of the urging surface 163, which contacts the contact surface 616, changes depending on the rotational angle of the pedal 10, this part of the urging surface 163 is positioned most forward toward the vehicle front side along the urging surface 163. Specifically, the contact part 1631 is a part of the urging surface 163, which has the smallest x-coordinate and contacts the straight line extending along the y-axis in the x-y coordinates shown in FIG. 8. The contact change amount $\Delta y$ at the time of rotating the pedal 10 is the amount of change in the y-coordinate in the case where the contact part 1631 is shown in the x-y coordinates.

The amount of change in the y-coordinate of the contact part 1631 relative to the amount of change in the x-coordinate of the contact part 1631 is increased as the virtual urging center VCe at the time of rotating the pedal 10 is moved away from the y-axis. In other words, the contact change amount $\Delta y$ at the time of rotating the pedal 10 is increased as the virtual urging center VCe at the time of rotating the pedal 10 is moved away from the virtual axis perpendicular line VLc. Also, the contact change amount $\Delta y$ at the time of rotating the pedal 10 is decreased as the virtual urging center VCe at the time of rotating the pedal 10 is moved toward the virtual axis perpendicular line VLc.

Therefore, the inclination of the load direction F at the time of urging the contact surface 616 by the urging surface 163 can be limited by ensuring that the virtual urging center VCe pass through the virtual axis perpendicular line VLc at the time of rotating the urging portion 162 integrally with the pedal 10 about the rotational axis O. Specifically, the amount of the load component in the y-direction included in the load at the time of urging the contact surface 616 by the urging surface 163 can be reduced. Furthermore, in this way, it is possible to limit an increase in the frictional force generated between the inner peripheral surface of the guide portion 614 and the outer peripheral surface of the guide member 63. Therefore, the urging portion 162 of the present embodiment is configured such that the virtual urging center VCe passes through the virtual axis perpendicular line VLc at the time of rotating the pedal 10 within the predetermined rotational range.

Figure 9:
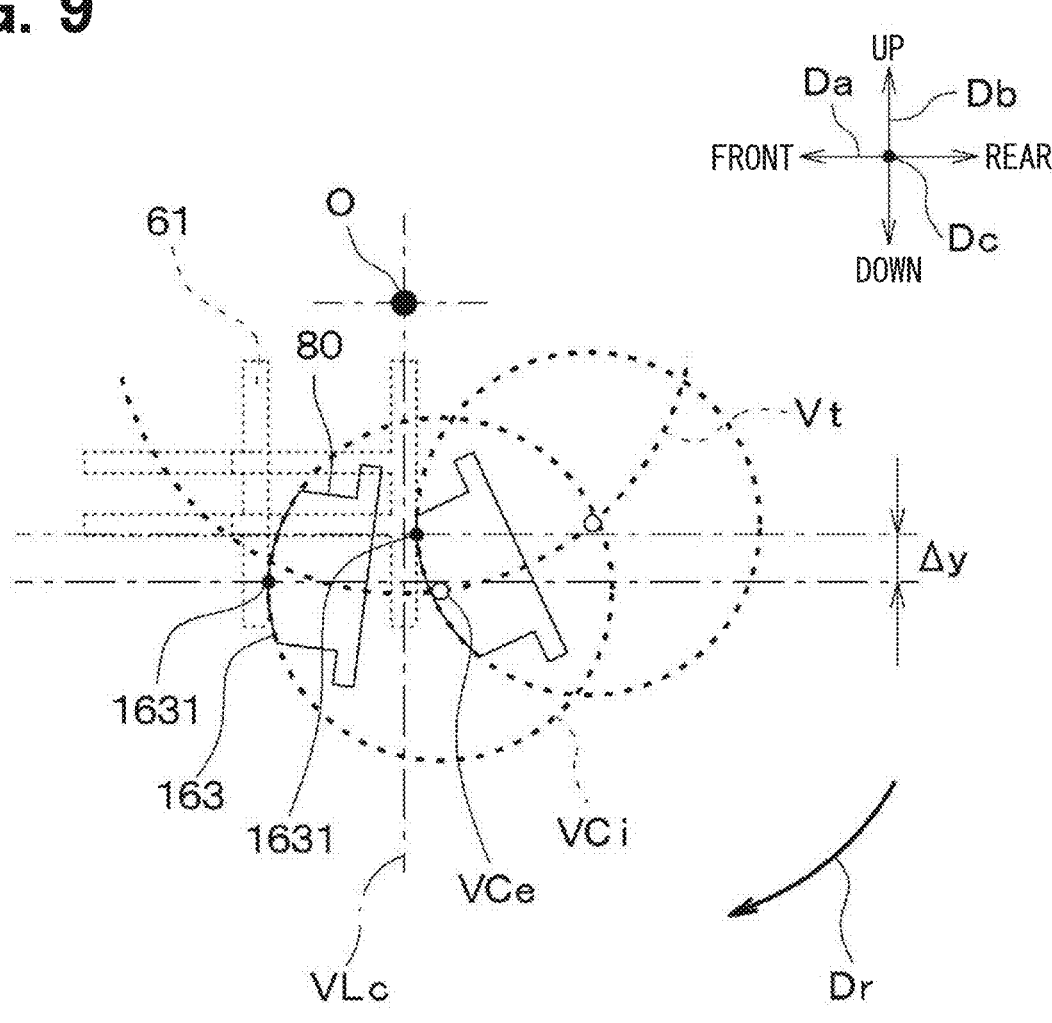
FIG. 9 is a diagram showing a contact change amount of a pedal device of a comparative example.
Figure 10:
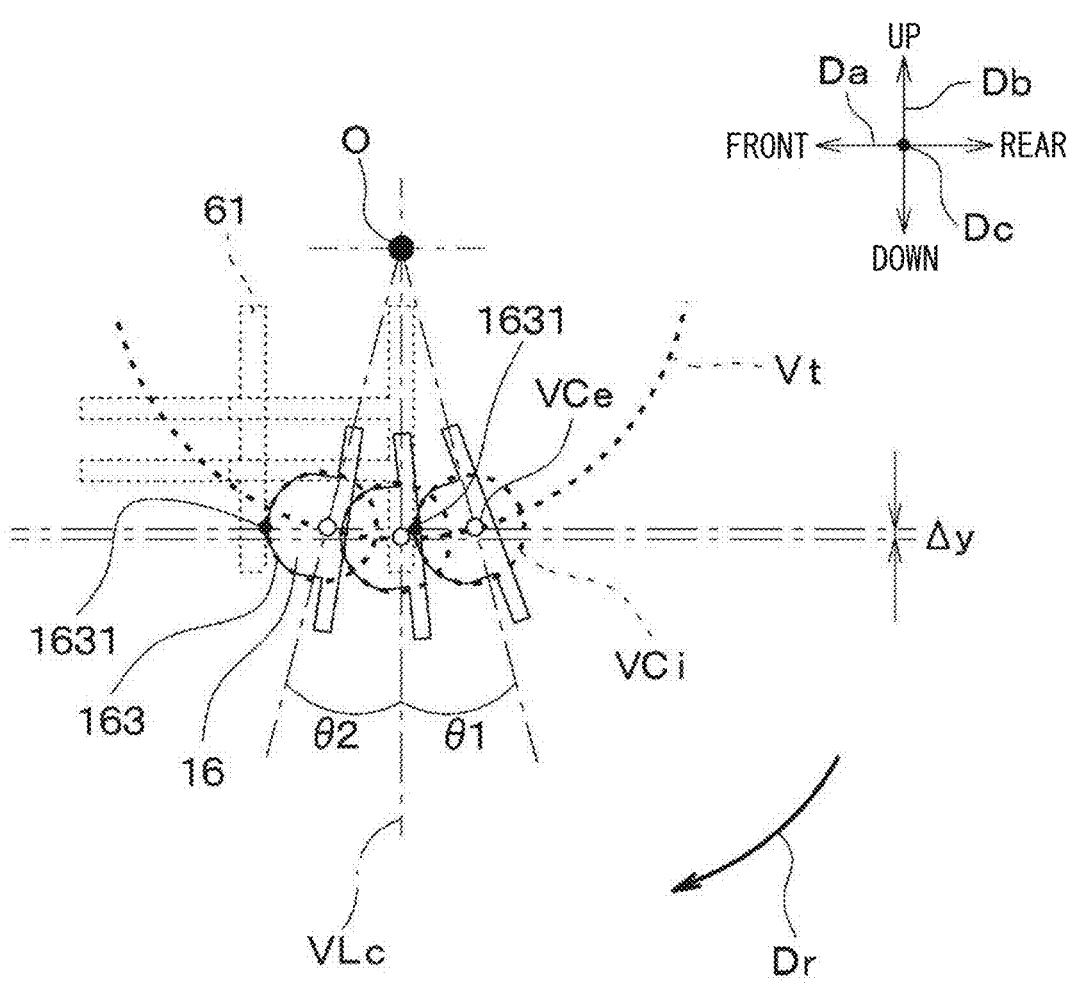
FIG. 10 is a diagram showing a contact change amount of the pedal device of the first embodiment.

Here, FIG. 9 shows the contact change amount $\Delta y$ at the time of rotating the pedal 10 from the contact start position to the final pedal position in a pedal device (hereinafter referred to as a comparative pedal device) of a comparative example that is provided for the purpose of comparison with the pedal device 1 of the present embodiment. In the comparative pedal device, a comparative lever projection 80 is used in place of the lever projection 16. FIG. 10 shows the contact change amount Δy at the time of rotating the pedal 10 from the contact start position to the final pedal position in the pedal device 1 of the present embodiment.

In FIGS. 9 and 10, for the purpose of easy understanding of the contact change amount Δy, the holder 61 placed at the contact start position and the holder 61 placed at the final pedal position are respectively indicated by a dotted line. Furthermore, the components, which are other than the rotational shaft (indicated by the rotational axis O), the lever projection 16 and the comparative lever projection 80, are omitted for the purpose of easy understanding.

As shown in FIG. 9, in the comparative lever projection 80 of the comparative pedal device, a radius (a radius of curvature) of the urging surface 163 is larger than that of the lever projection 16 of the present embodiment. Because of this, a radius of the virtual urging circle VCi is increased. It is configured such that the virtual urging center VCe does not pass through the virtual axis perpendicular line VLc at the time of rotating the pedal 10 from the contact start position to the final pedal position.

Therefore, the position of the contact part 1631 in the vehicle up-down direction Db is lowered continuously toward the vehicle lower side at the time of rotating the pedal 10 from the contact start position to the final pedal position. Thus, in the comparative pedal device, the contact change amount Δy tends to become large at the time of rotating the pedal 10 from the contact start position to the final pedal position.

In comparison to this, the pedal device 1 of the present embodiment is configured such that the virtual urging center VCe passes through the virtual axis perpendicular line VLc at the time of rotating the pedal 10 from the contact start position to the final pedal position, as shown in FIG. 10. Specifically, the position of the contact part 1631 in the vehicle up-down direction Db is lowered gradually toward the vehicle lower side at the time of rotating the pedal 10 from the contact start position to the final pedal position. When the virtual urging center VCe is rotated to the position where the virtual urging center VCe overlaps the virtual axis perpendicular line VLc, the contact part 1631 is placed at the lowest position that is lowest toward the vehicle lower side in the rotational range of the pedal 10. The position of the contact part 1631 in the vehicle up-down direction Db gradually changes toward the vehicle upper side after passing through the virtual axis perpendicular line VLc.

The pedal device 1 of the present embodiment is configured such that the angle θ1 and the angle θ2 become identical angles which are identical to each other. Specifically, at the time of rotating the pedal 10 from the contact start position to the final pedal position, the urging portion 162 can be rotated by the same angle (identical angle) toward the one side and also toward the other side with reference to the virtual axis perpendicular line VLc. Therefore, the position of the contact part 1631 in the vehicle up-down direction Db at the time of placing the pedal 10 at the contact start position is substantially identical to the position of the contact part 1631 in the vehicle up-down direction Db at the time of placing the pedal 10 at the final pedal position.

As described above, the position of the contact part 1631 in the vehicle up-down direction Db slightly changes in the vehicle up-down direction Db with reference to the lowest position of the contact part 1631 that is lowest toward the vehicle lower side. Therefore, the contact change amount Δy at the time of rotating the pedal 10 from the contact start position to the final pedal position can be made relatively small in comparison to the case where the virtual urging center VCe does not pass through the virtual axis perpendicular line VLc. As a result, the contact change amount Δy can be limited.

As described above, in the pedal device 1 of the present embodiment, the virtual urging center VCe passes through the virtual axis perpendicular line VLc at the time of rotating the pedal 10 from the contact start position to the final pedal position in the predetermined rotational range. With this configuration, a moving direction of the holder 61 is less likely to deviate from the vehicle front-rear direction Da at the time of moving the holder 61 in response to the rotation of the pedal 10 by the pressing operation of the pedal 10 by the driver. Furthermore, the amount of change in the position of the part of the urging surface 163, which contacts the contact surface 616, in the direction along the virtual axis perpendicular line VLc can be made smaller in comparison to the case where the virtual urging center VCe does not pass through the virtual axis perpendicular line VLc at the time of rotating the pedal 10 within the predetermined rotational range. That is, the change amount Δy can be made smaller than that of the case where the virtual urging center VCe does not pass through the virtual axis perpendicular line VLc. Thus, the urging surface 163 can be placed in contact with the contact surface 616 in the state where the position of the contact part 1631 at the time of urging the contact surface 616 by the urging surface 163 is placed as close as possible to the virtual axial line VLAx. Furthermore, it is possible to limit the increase in the frictional force which is generated between the inner peripheral surface of the guide portion 614 and the outer peripheral surface of the guide member 63 at the time of urging the contact surface 616 by the urging surface 163. Therefore, it is possible to limit the deviation of the reaction force, which is generated by the reaction force generating mechanism 60, from the design value.

Furthermore, the present embodiment described above can provide the following advantages.

(1) In the embodiment described above, the reaction force generating mechanism 60 includes the first resilient member 71 and the second resilient member 72 which are configured to be resiliently deformed by the pedal force of the driver to generate the reaction force.

With this configuration, as compared to a case, in which the reaction force generating mechanism 60 includes only the single resilient member, the design value of the reaction force against the pedal force can be set to an arbitrary amount.

(2) In the embodiment described above, the first resilient member 71 and the second resilient member 72 are arranged in series.

With this configuration, compared to a case, in which the first resilient member 71 and the second resilient member 72 are arranged in parallel, the design value of the reaction force against the pedal force can be easily adjusted.

(3) In the embodiment described above, the second resilient member 72 is placed between the pedal 10 and the holder 61 and forms the predetermined size of the gap between the contact surface 616 and the urging surface 163 at the time of releasing the pressing operation of the pedal 10.

With this configuration, although the reaction force is generated through the compression of the second resilient member 72 at the time of rotating the pedal 10 from the initial pedal position to the contact start position, the pedal force applied to the pedal 10 is not transmitted to the holder 61 through the urging portion 162. Thus, the pedal force applied to the pedal 10 is less likely to be transmitted to the first resilient member 71.

At the time of further rotating the pedal 10 from the contact start position, the second resilient member 72 is compressed to generate the reaction force, and the pedal force applied to the pedal 10 is transmitted to the holder 61 through the urging portion 162, and thereby the first resilient member 71 is compressed to generate the reaction force. As described above, the number of the resilient members, which generate the reaction force, can be changed in the middle of the rotation of the pedal 10, and thereby the amount of the reaction force can be adjusted in a stepwise manner. Particularly, in the case where the pedal device 1 is applied to the brake-by-wire system 150, the operability, which is unique to the brake operation, can be easily reproduced by generating the reaction force in the stepwise manner discussed above. During the brake operation, a sensitive reaction force, which is sensitive to the pedal force applied to the pedal immediately after the start of the pressing of the pedal, is required. However, the pedal force applied to the pedal 10 is less likely to be transmitted to the holder 61 during the time of rotating the pedal 10 from the initial pedal position to the contact start position. Therefore, at the time immediately after the start of the pressing of the pedal 10 where the sensitive reaction force is required, it is possible to limit the generation of resistance caused by the friction generated through the sliding movement between the inner peripheral surface of the guide portion 614 and the outer peripheral surface of the guide member 63.

(4) In the embodiment described above, at the time of rotating the pedal 10 within the contact range in which the urging surface 163 and the contact surface 616 are kept in contact with each other, the pedal 10 is rotatable up to the angle θ1 toward the other side with reference to the virtual axis perpendicular line VLc and is also rotatable up to the angle θ2 toward the one side with reference to the virtual axis perpendicular line VLc.

With this configuration, the position of the contact part 1631 at the time of urging the contact surface 616 by the urging surface 163 can be easily brought close to the virtual axial line VLAx, so that the urging force, which is applied from the urging surface 163 to the contact surface 616, can be easily stabilized.

Furthermore, in comparison to a case, in which the pedal 10 is not configured in the above-described manner, the contact change amount Δy at the time of rotating the pedal 10 from the contact start position to the final pedal position can be minimized. Therefore, it is possible to further limit the generation of the frictional force between the inner peripheral surface of the guide portion 614 and the outer peripheral surface of the guide member 63 at the time of urging the contact surface 616 by the urging surface 163, and thereby it is possible to reduce the amount of wear of the inner peripheral surface of the guide portion 614 and the outer peripheral surface of the guide member 63.

(5) In the embodiment described above, at the time when the pedal 10 is rotated to the angle θ1 with reference to the virtual axis perpendicular line VLc, the part of the urging surface 163 of the urging portion 162, which contacts the contact surface 616, is positioned on the virtual axial line VLAx. Furthermore, at the time when the pedal 10 is rotated to the angle θ2 with reference to the virtual axis perpendicular line VLc, the part of the urging surface 163 of the urging portion 162, which contacts the contact surface 616, is positioned on the virtual axial line VLAx.

With this configuration, when the pedal 10 is placed at the final pedal position, the urging surface 163 can urge the contact surface 616 in the direction which is along the virtual axial line VLAx. Therefore, when the pedal 10 is placed at the final pedal position, the urging surface 163 can stably urge the contact surface 616.

Particularly, in the case where the pedal device 1 is applied to the brake-by-wire system 150, the stable urging force to the holder 61 is required at the time when the pedal 10 is placed in the final pedal position. With respect to this point, according to the present embodiment, the holder 61 can be stably urged.

(6) In the embodiment described above, each of the first resilient member 71 and the second resilient member 72 is formed by the coil spring.

With this configuration, compared to a case, in which each of the first resilient member 71 and the second resilient member 72 is formed by, for example, rubber, the amount of resilient deformation can be easily increased at the time when the first resilient member 71 and the second resilient member 72 are compressed and are resiliently deformed. Therefore, the required amount of rotation of the pedal portion 12 can be easily ensured at the time of rotating the pedal portion 12 by the pedal force of the driver.

Second Embodiment

Figure 11:
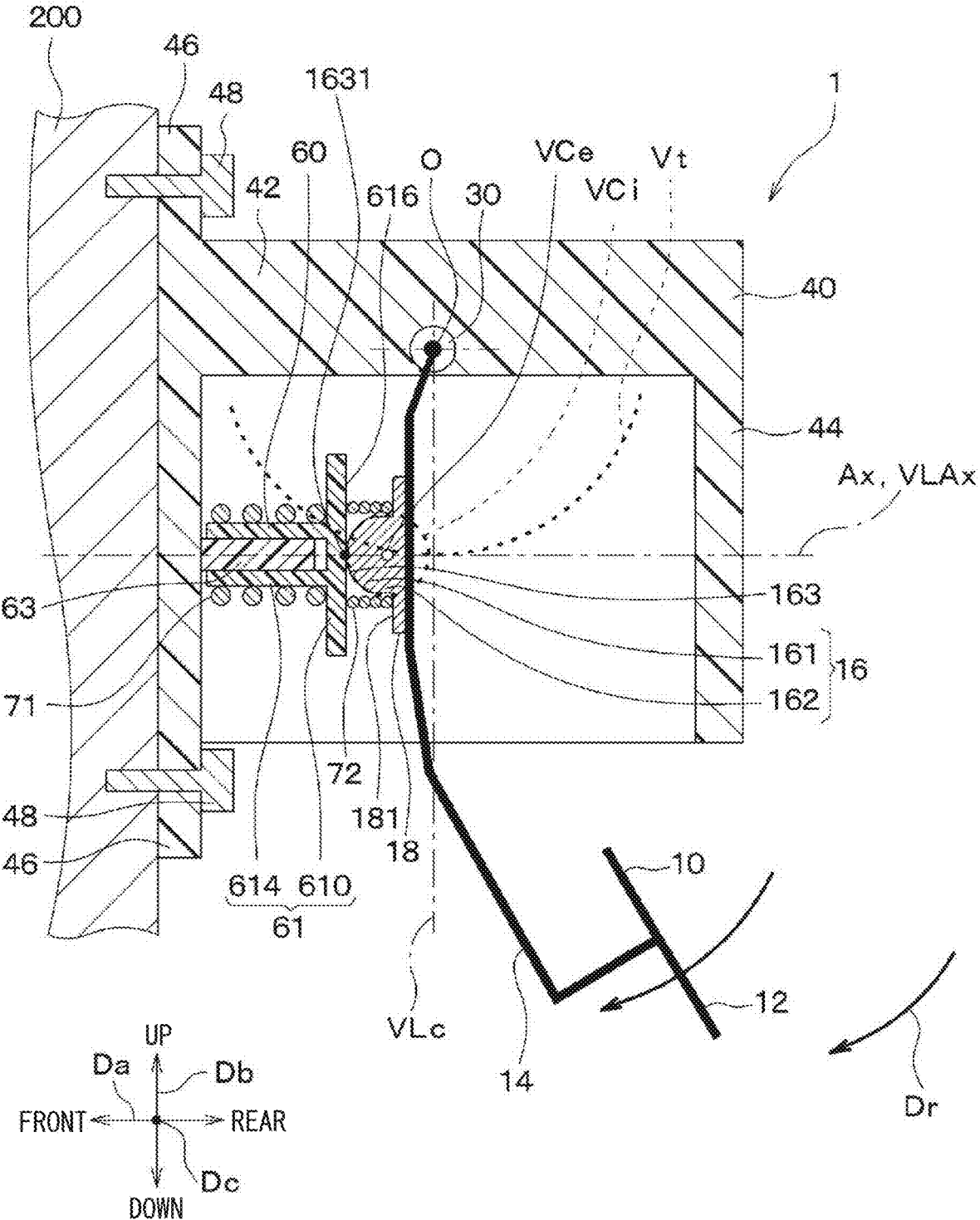
FIG. 11 is a cross-sectional view of a pedal device of a second embodiment.

Next, a second embodiment will be described with reference to FIG. 11. In the present embodiment, the structure, at which the lever projection 16 is placed, is different from that of the first embodiment. The rest of the present embodiment is the same as that of the first embodiment. Therefore, in the present embodiment, different portions, which are different from those of the first embodiment, will be mainly described, and the same portions, which are the same as those of the first embodiment, will not be described for the sake of simplicity.

The lever projection 16 of the present embodiment is configured such that the support surface 181 and the contact surface 616 are opposed to each other when the pedal 10 is placed at the final pedal position. Specifically, the support surface 181 and the contact surface 616 are perpendicular to the vehicle front-rear direction Da and are substantially parallel to each other when the pedal 10 is placed at the final pedal position.

With this configuration, when the pedal 10 is placed at the final pedal position, the second resilient member 72 can be compressed along the virtual axial line VLAx, and thereby the second resilient member 72 can be most compressed. Therefore, when the pedal 10 is placed at the final pedal position, the reaction force, which is generated by the second resilient member 72, can be further stabilized.

Third Embodiment

Next, a third embodiment will be described with reference to FIG. 12. In the present embodiment, the structure, at which the lever projection 16 is placed, is different from that of the first embodiment. The rest of the present embodiment is the same as that of the first embodiment. Therefore, in the present embodiment, different portions, which are different from those of the first embodiment, will be mainly described, and the same portions, which are the same as those of the first embodiment, will not be described for the sake of simplicity.

Figure 12:
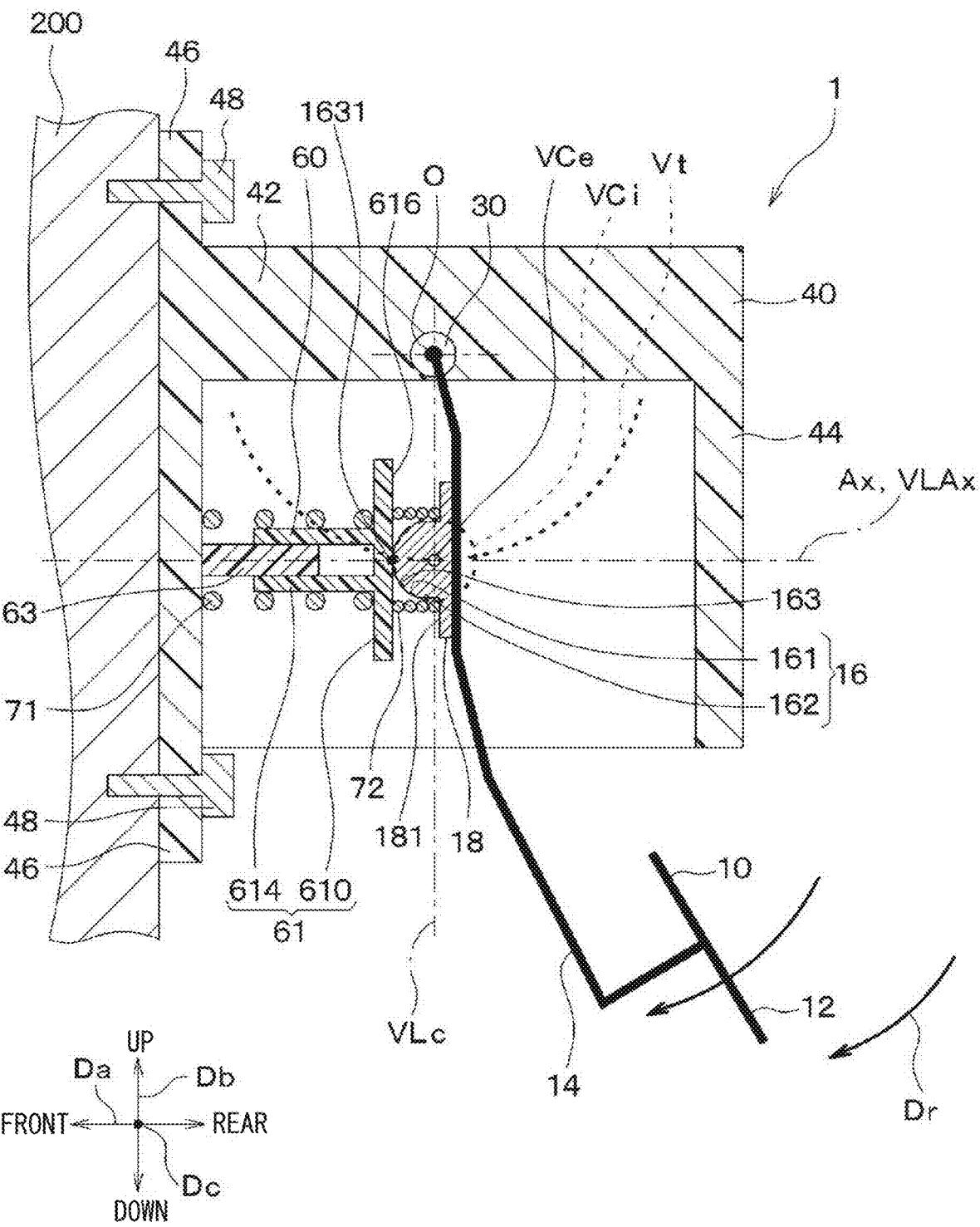
FIG. 12 is a cross-sectional view of a pedal device of a third embodiment.

As shown in FIG. 12, the lever projection 16 of the present embodiment is placed at a position where the virtual axial line VLAx becomes a tangent line that is tangent to the center trajectory Vt. Furthermore, the contact part 1631 of the lever projection 16 is placed on the virtual axial line VLAx when the pedal 10 is rotated to a position where the virtual urging center VCe overlaps the virtual axis perpendicular line VLc. That is, the lever projection 16 is placed at the position where the virtual urging center VCe is placed on the virtual axis perpendicular line VLc when the contact part 1631 of the lever projection 16 is placed at the lowest position, which is lowest toward the vehicle lower side, along the center trajectory Vt.

Furthermore, the support surface 181 and the contact surface 616 are opposed to each other when the pedal 10 is rotated to the position where the virtual urging center VCe overlaps the virtual axis perpendicular line VLc. Specifically, the support surface 181 and the contact surface 616 are perpendicular to the vehicle front-rear direction Da and are opposed to each other when the pedal 10 is rotated to the position where the virtual urging center VCe overlaps the virtual axis perpendicular line VLc.

With this configuration, the urging surface 163 can urge the contact surface 616 in the direction, which is along the virtual axial line VLAx, when the pedal 10 is rotated to the position where the virtual urging center VCe overlaps the virtual axis perpendicular line VLc. Therefore, the second resilient member 72 is most compressed by compressing the second resilient member 72 along the virtual axial line VLAx when the pedal 10 is rotated to the position where the virtual urging center VCe overlaps the virtual axis perpendicular line VLc. Thus, the urging surface 163 can further stably urge the contact surface 616 when the pedal 10 is rotated to the position where the virtual urging center VCe overlaps the virtual axis perpendicular line VLc.

Particularly, in the case where the pedal device 1 is applied to the brake-by-wire system 150, when the pedal 10 is pressed by the driver from the contact start position to the final pedal position, the stable urging force to the holder 61 is required around a midpoint of this range. Thus, according to the present embodiment, the urging surface 163 can further stably urge the contact surface 616 by compressing the second resilient member 72 the most when the stable urging force on the holder 61 is required.

Fourth Embodiment

Figure 13:
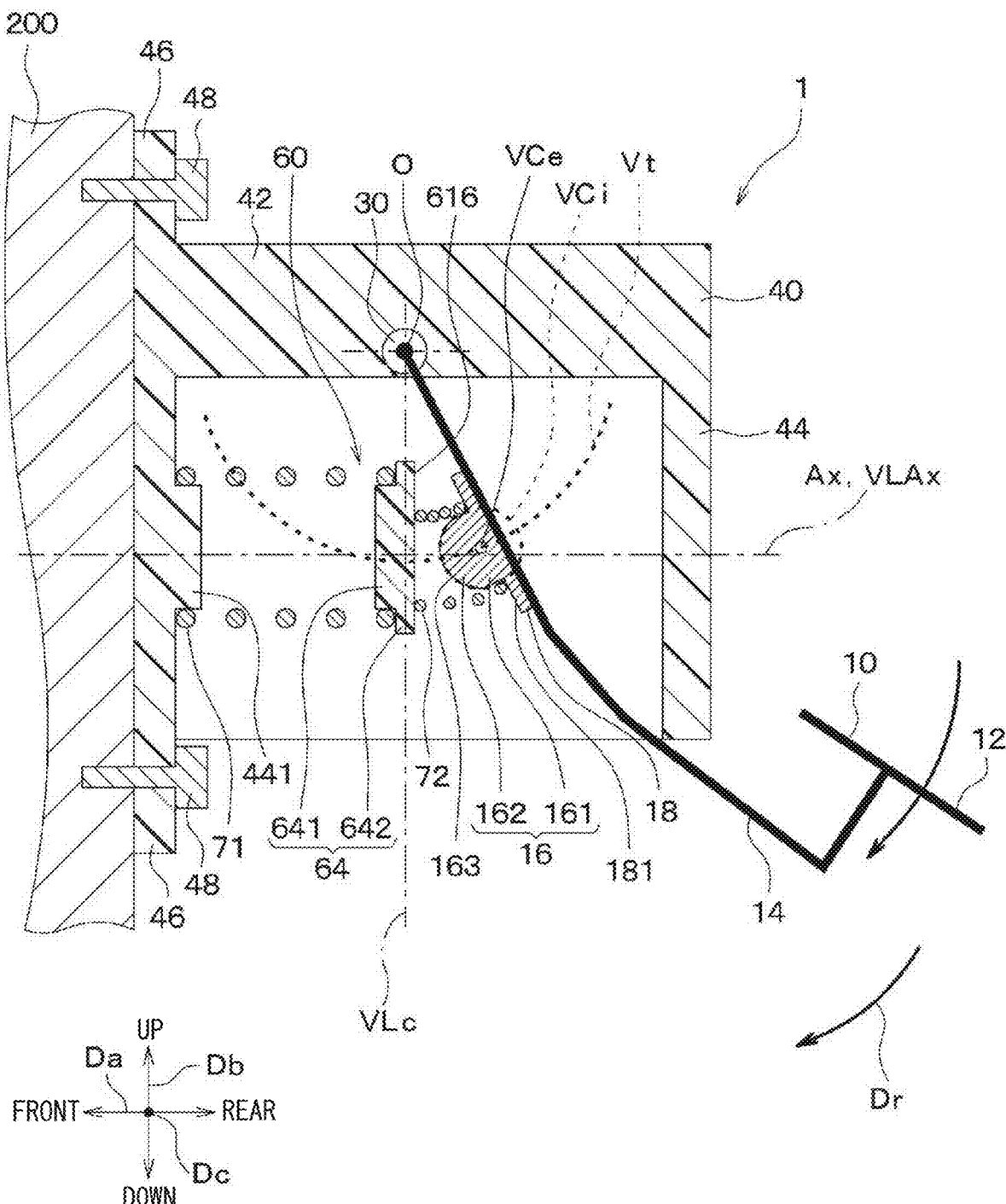
FIG. 13 is a cross-sectional view of a pedal device of a fourth embodiment.

Next, a fourth embodiment will be described with reference to FIG. 13. The present embodiment differs from the first embodiment in that the guide member 63 of the reaction force generating mechanism 60 is eliminated, and the holder 61 is replaced by a first resiliency support portion 64. The shape of the housing tubular portion 44 of the present embodiment partially differs from that of the first embodiment. The rest of the present embodiment is the same as that of the first embodiment. Therefore, in the present embodiment, different portions, which are different from those of the first embodiment, will be mainly described, and the same portions, which are the same as those of the first embodiment, will not be described for the sake of simplicity.

The reaction force generating mechanism 60 of the present embodiment includes the first resiliency support portion 64, which supports the first resilient member 71, in addition to the first resilient member 71 and the second resilient member 72. The reaction force generating mechanism 60 applies the reaction force against the pedal force applied from the driver to the pedal 10 by resiliently deforming the first resilient member 71 and the second resilient member 72 by the pedal force applied from the driver to the pedal 10. Furthermore, the reaction force generating mechanism 60 restores the pedal 10 to a reference position by restoring the shapes of the first resilient member 71 and the second resilient member 72, which have been resiliently deformed, when the brake operation by the driver is released.

The first resiliency support portion 64 is a member that supports the first resilient member 71 and the second resilient member 72. Specifically, the first resiliency support portion 64 supports the rear part of the first resilient member 71 facing the vehicle rear side and also supports the front part of the second resilient member 72 facing the vehicle front side. The first resiliency support portion 64 includes a small diameter support portion 641 and a large diameter support portion 642 which are stacked in the vehicle front-rear direction Da.

Each of the small diameter support portion 641 and the large diameter support portion 642 is shaped in a circular disk form. An outer diameter of the small diameter support portion 641 is smaller than an outer diameter of the large diameter support portion 642. The outer diameter of the small diameter support portion 641 is smaller than an inner diameter of the first resilient member 71 which is the coil spring. The small diameter support portion 641 is placed in a space formed at the inside of the first resilient member 71. Thereby, the first resilient member 71 is fitted to the small diameter support portion 641, so that movement of the first resilient member 71 relative to the small diameter support portion 641 in the vehicle up-down direction Db and the vehicle left-right direction Dc is limited.

The outer diameter of the large diameter support portion 642 is larger than an outer diameter of the first resilient member 71. A surface of the large diameter support portion 642, which faces the vehicle front side, supports the rear part of the first resilient member 71 which faces the vehicle rear side. The large diameter support portion 642 has the contact surface 616, which faces the vehicle rear side, and the contact surface 616 supports the front part of the second resilient member 72 which faces the vehicle front side. The second resilient member 72 is placed in a compressed state between the contact surface 616 of the large diameter support portion 642 and the support surface 181 of the lever flange 18.

The housing tubular portion 44 of the present embodiment includes a second resiliency support portion 441 that supports the front part of the first resilient member 71 which faces the vehicle front side. The second resiliency support portion 441 is shaped in a cylindrical form and has an outer diameter which is slightly smaller than the inner diameter of the first resilient member 71. The second resiliency support portion 441 projects toward the vehicle rear side from the inner surface of the housing tubular portion 44 which is placed on the vehicle front side. The first resilient member 71 is supported by the housing tubular portion 44 in the state where the front part of the first resilient member 71, which faces the vehicle front side, is fitted to the second resiliency support portion 441. Thereby, movement of the first resilient member 71 relative to the second resiliency support portion 441 in the vehicle up-down direction Db and the vehicle left-right direction Dc is limited. The first resilient member 71 is placed in a compressed state between the large diameter support portion 642 and the inner surface of the housing tubular portion 44.

In the pedal device 1, which includes the first resiliency support portion 64 and the second resiliency support portion 441 described above, the urging portion 162 of the pedal 10 is supported by the first resilient member 71 and the second resilient member 72 in the state in which the pedal portion 12 is not pressed by the driver. When the pedal portion 12 is pressed by the driver, the lever portion 14 is rotated integrally with the pedal portion 12 about the rotational axis O. Therefore, the urging surface 163 and the contact surface 616 contact with each other in the state where the virtual urging center VCe is placed on the vehicle rear side of the virtual axis perpendicular line VLc. Furthermore, since the force outputted from the pedal portion 12 is transmitted to the second resilient member 72 through the lever flange 18, the second resilient member 72 is compressed.

When the pedal portion 12 is further rotated from the contact start position in the pedal rotational direction Dr by the pedal force of the driver, the urging surface 163 urges the contact surface 616, and thereby the force of the pedal portion 12 is transmitted to the first resiliency support portion 64. Therefore, the first resiliency support portion 64 is moved toward the vehicle front side in the vehicle front-rear direction Da, and the first resilient member 71 is compressed by the first resiliency support portion 64. The first resiliency support portion 64 of the present embodiment serves as a linearly moving portion.

When the first resiliency support portion 64 is urged by the urging surface 163 and is moved toward the vehicle front side in the vehicle front-rear direction Da, the part of the urging surface 163, which contacts the contact surface 616, is moved toward the vehicle lower side beyond the virtual axial line VLAx. Furthermore, the virtual urging center VCe is rotated along the center trajectory Vt in the pedal rotational direction Dr to move toward the virtual axis perpendicular line VLc.

When the first resiliency support portion 64 is further urged by the urging surface 163 and is further moved toward the vehicle front side beyond the position where the virtual urging center VCe overlaps the virtual axis perpendicular line VLc, the part of the urging surface 163, which contacts the contact surface 616, is moved toward the vehicle lower side beyond the virtual axial line VLAx.

As described above, the pedal device 1 of the present embodiment is configured such that the virtual urging center VCe passes through the virtual axis perpendicular line VLc at the time of rotating the pedal 10 from the contact start position to the final pedal position. At the time of rotating the pedal 10 from the contact start position to the final pedal position, the part of the urging surface 163, which contacts the contact surface 616, is moved toward the vehicle lower side beyond the virtual axial line VLAx and is then moved toward the vehicle upper side after passing through the virtual axis perpendicular line VLc.

With this configuration, the moving direction of the holder 61 is less likely to deviate from the vehicle front-rear direction Da at the time of moving the holder 61 in response to the rotation of the pedal 10 by the pressing operation of the pedal 10 by the driver. Furthermore, the contact change amount Δy at the time of rotating the pedal 10 from the contact start position to the final pedal position can be made relatively small in comparison to the case where the virtual urging center VCe does not pass through the virtual axis perpendicular line VLc. Therefore, the moving direction of the first resiliency support portion 64 is less likely to deviate from the vehicle front-rear direction Da at the time of moving the first resiliency support portion 64 in response to the rotation of the pedal 10 by the pressing operation of the pedal 10 by the driver. Therefore, it is possible to limit the deviation of the reaction force, which is generated by the reaction force generating mechanism 60, from the design value.

The rest of the structure of the present embodiment is the same as that of the first embodiment. The pedal device 1 of the present embodiment can achieve the advantages, which are achieved by the common configuration or equivalent configuration that is common to or equivalent to the first embodiment described above.

In the fourth embodiment described above, the inside of the first resilient member 71 is supported by fitting the front part of the first resilient member 71, which faces the vehicle front side, to the second resiliency support portion 441, and fitting the rear part of the first resilient member 71, which faces the vehicle rear side, to the small diameter support portion 641. However, the present disclosure is not limited to this. For example, the outside of the first resilient member 71 may be supported. In this case, the housing tubular portion 44 may have a member, which is shaped in a circular ring form and supports the outside of the front part of the first resilient member 71, which faces the vehicle front side. Furthermore, the first resiliency support portion 64 may have a member which is shaped in a circular ring form and supports the outside of the rear part of the first resilient member 71 which faces the vehicle rear side.

Furthermore, in the fourth embodiment, there is described the example, in which the second resilient member 72 is supported in the compressed state between the contact surface 616 of the large diameter support portion 642 and the support surface 181 of the lever flange 18. However, the present disclosure is not limited to this. For example, the inside or the outside of the second resilient member 72 may be supported. In this case, the large diameter support portion 642 may have a member which is shaped in a cylindrical form and supports the inside of the front part of the second resilient member 72 which faces the vehicle front side, or the large diameter support portion 642 may have a member which is shaped in a circular ring form and supports the outside of the front part of the second resilient member 72 which faces the vehicle front side. Furthermore, the lever flange 18 may have a member which is shaped in a cylindrical form and supports an inside of the rear part of the second resilient member 72 which faces the vehicle rear side, or the lever flange 18 may have a member which is shaped in a circular ring form and supports an outside of the rear part of the second resilient member 72 which faces the vehicle rear side.

Fifth Embodiment

Next, a fifth embodiment will be described with reference to FIG. 14. In the present embodiment, the shape of the first resiliency support portion 64 differs from that of the fourth embodiment. The rest of the present embodiment is the same as that of the fourth embodiment. Therefore, in the present embodiment, different portions, which are different from those of the fourth embodiment, will be mainly described, and the same portions, which are the same as those of the fourth embodiment, will not be described for the sake of simplicity.

Figure 14:
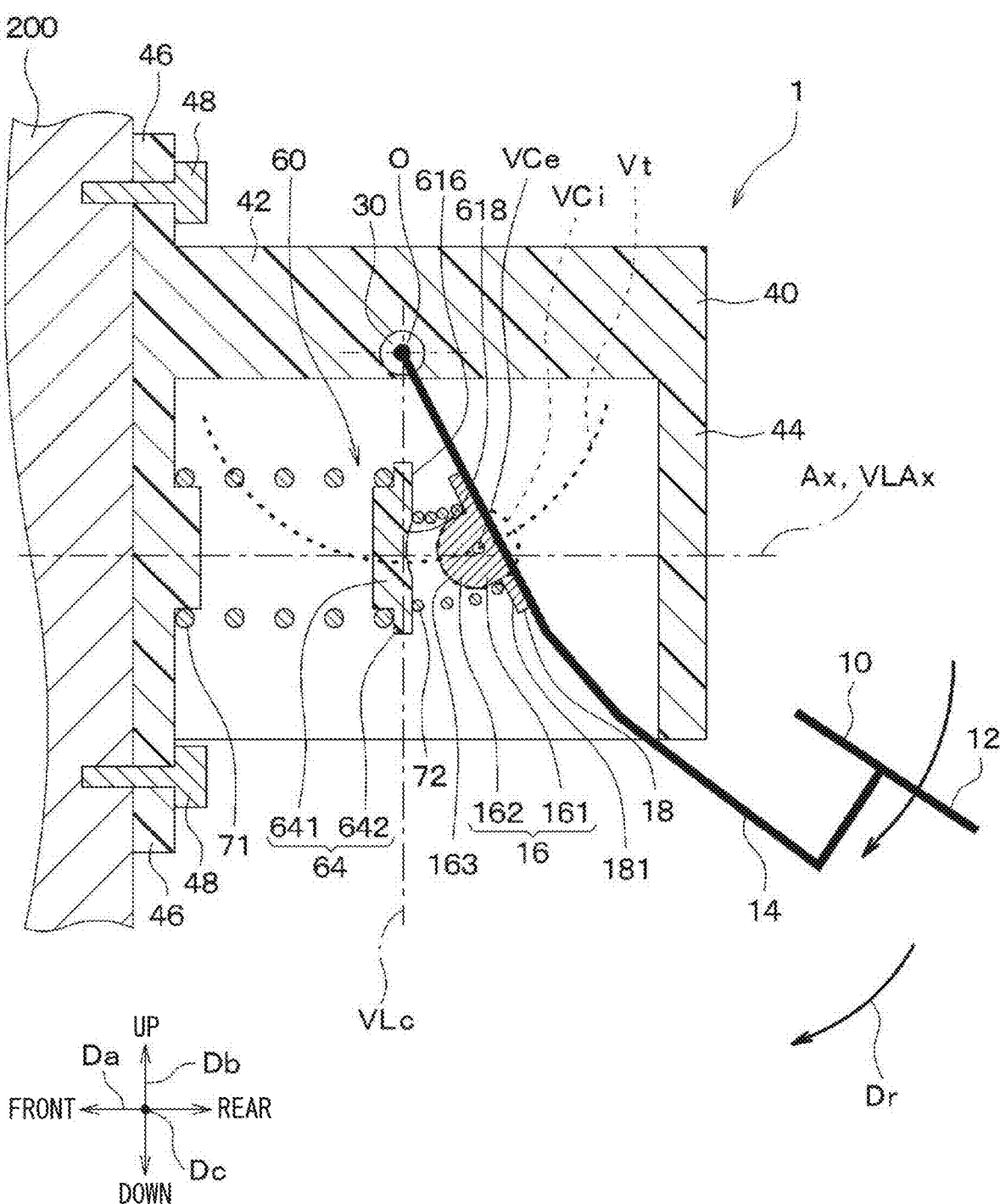
FIG. 14 is a cross-sectional view of a pedal device of a fifth embodiment.

As shown in FIG. 14, the first resiliency support portion 64 of the present embodiment has a recess 618 which is formed at the contact surface 616 and is in a form of a curved surface that is concave toward the vehicle front side. The recess 618 corresponds to the shape of the urging surface 163 of the urging portion 162 such that the urging surface 163 can be fitted into the recess 618. Specifically, the recess 618 is shaped in a form of a hemispherical surface that is concave toward the side opposite to the urging portion 162. In a cross-section of the recess 618, which perpendicular to the vehicle left-right direction Dc, the recess 618 has substantially an arcuate shape. A size of a virtual circle, which forms an arc that extends along the surface of the recess 618, is substantially the same as a size of the virtual urging circle VCi which extends along the urging surface 163.

The rest of the structure of the present embodiment is the same as that of the fourth embodiment. The pedal device 1 of the present embodiment can achieve the advantages, which are achieved by the common configuration or equivalent configuration that is common to or equivalent to the fourth embodiment described above.

In the present embodiment, compared to the first embodiment, there is described the example, in which the holder 61 and the guide member 63 of the reaction force generating mechanism 60 are eliminated. However, the reaction force generating mechanism 60 may be configured to have the holder 61 and the guide member 63 described in the first embodiment.

Sixth Embodiment

Next, a sixth embodiment will be described with reference to FIG. 15. In the present embodiment, the shape of the urging portion 162 and the shape of the first resiliency support portion 64 differ from those of the fourth embodiment. The rest of the present embodiment is the same as that of the fourth embodiment. Therefore, in the present embodiment, different portions, which are different from those of the fourth embodiment, will be mainly described, and the same portions, which are the same as those of the fourth embodiment, will not be described for the sake of simplicity.

Figure 15:
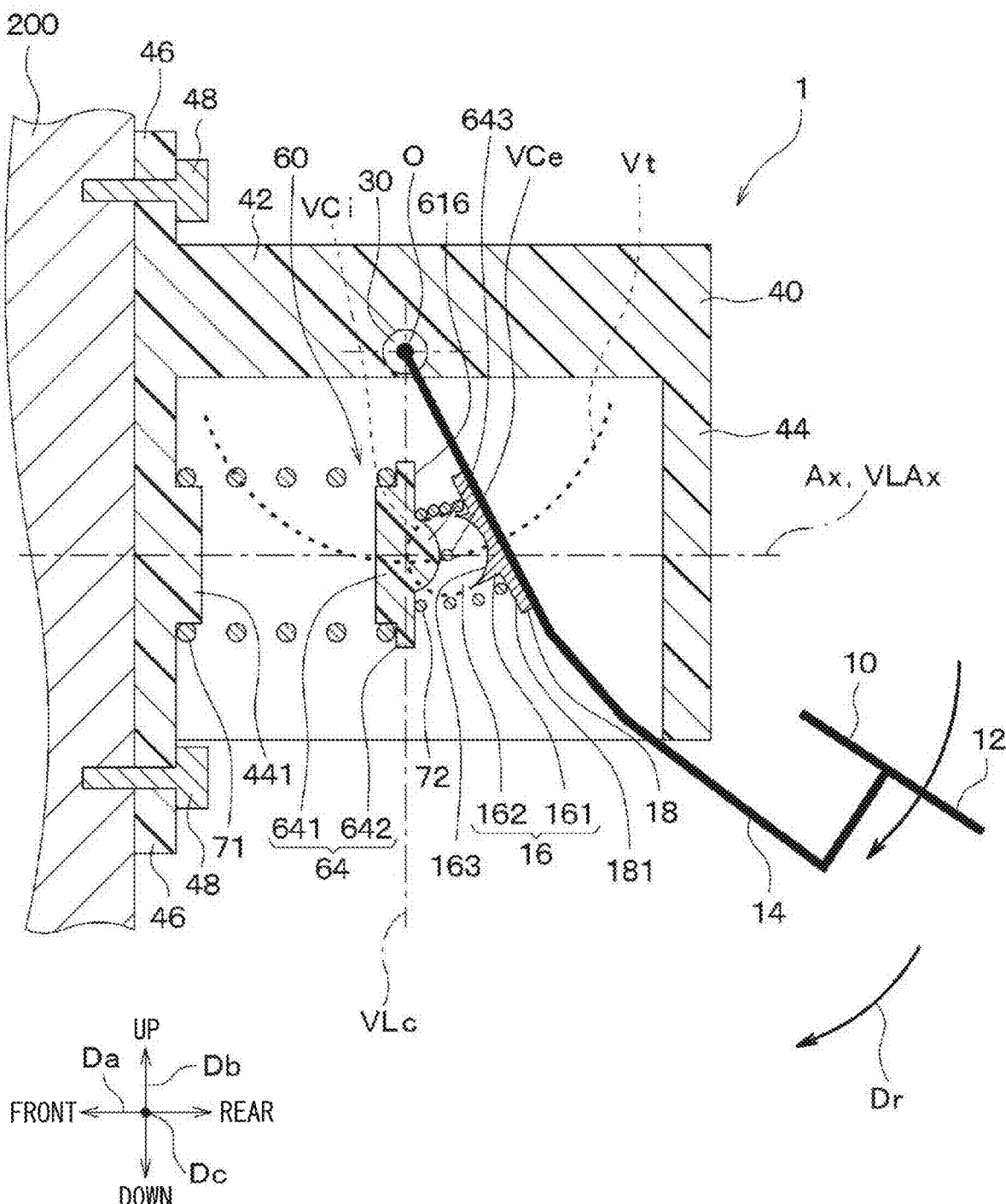
FIG. 15 is a cross-sectional view of a pedal device of a sixth embodiment.

As shown in FIG. 15, in the urging portion 162 of the present embodiment, the urging surface 163 is concave toward the vehicle rear side. The urging surface 163 is shaped in a form of a curved surface that is concave toward the side opposite to the reaction force generating mechanism 60. That is, the urging surface 163 is in the form of the curved surface that is concave toward the vehicle rear side and the vehicle upper side in the initial pedal position before the pedal 10 is pressed by the driver. Specifically, in the cross-section of the urging surface 163, which is perpendicular to the vehicle left-right direction Dc, the urging surface 163 has a shape of an arc which has a center of the arc that is centered on the virtual urging center VCe. The urging surface 163 corresponds to the shape of the first resiliency support portion 64 such that the first resiliency support portion 64 can be fitted into the urging surface 163.

The first resiliency support portion 64 of the present embodiment includes a protrusion 643 which is formed at the contact surface 616 and is bulged toward, i.e., is convex toward the vehicle rear side. The protrusion 643 corresponds to the shape of the urging surface 163 of the urging portion 162 such that the urging surface 163 can be fitted to the protrusion 643. Specifically, the protrusion 643 is shaped substantially in a hemispherical form, and a part of the protrusion 643, which is opposite to a connecting part of the protrusion 643 connected to the large diameter support portion 642, is convex. In a cross-section of the protrusion 643, which is perpendicular to the vehicle left-right direction Dc, a surface of the protrusion 643 is in a form of an arc. A size of a virtual circle, which forms the arc that extends along the surface of the protrusion 643, is substantially the same as the size of the virtual urging circle VCi which extends along the urging surface 163.

The rest of the structure of the present embodiment is the same as that of the first embodiment. The pedal device 1 of the present embodiment can achieve the advantages, which are achieved by the common configuration or equivalent configuration that is common to or equivalent to the fourth embodiment described above.

In the present embodiment, compared to the first embodiment, there is described the example, in which the holder 61 and the guide member 63 of the reaction force generating mechanism 60 are eliminated. However, the reaction force generating mechanism 60 may be configured to have the holder 61 and the guide member 63 described in the first embodiment.

Seventh Embodiment

Next, a seventh embodiment will be described with reference to FIG. 16. The present embodiment differs from the fourth embodiment in that the urging surface 163 contacts the reaction force generating mechanism 60 when the pedal 10 is placed at the initial pedal position. In the present embodiment, the structure of the reaction force generating mechanism 60 is different from that of the fourth embodiment. The rest of the present embodiment is the same as that of the fourth embodiment. Therefore, in the present embodiment, different portions, which are different from those of the fourth embodiment, will be mainly described, and the same portions, which are the same as those of the fourth embodiment, will not be described for the sake of simplicity.

Figure 16:
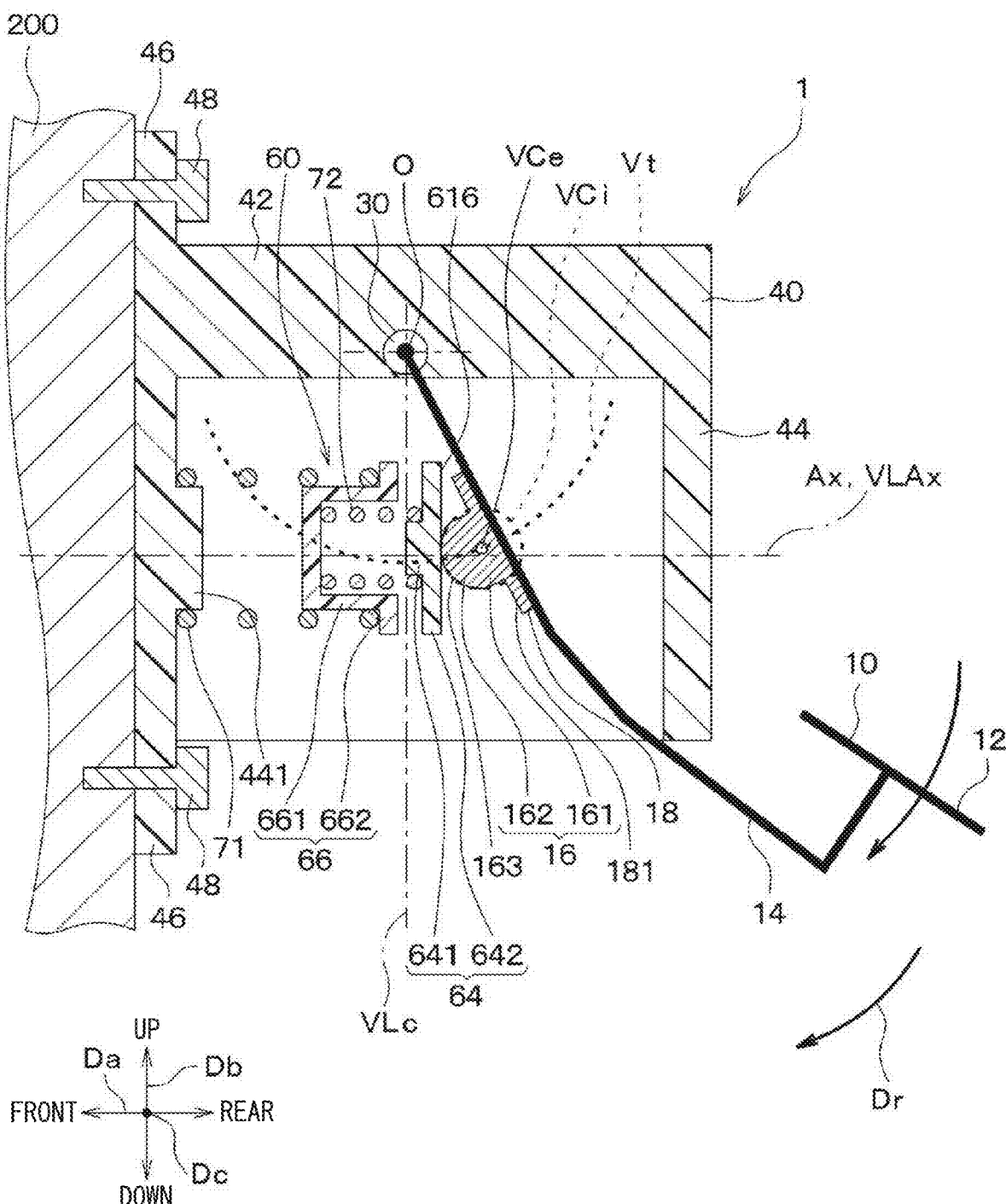
FIG. 16 is a cross-sectional view of a pedal device of a seventh embodiment.

FIG. 16 shows a state where the pedal 10 is placed at the initial pedal position. As shown in FIG. 16, the urging portion 162 of the present embodiment is configured such that when the pedal 10 is placed at the initial pedal position, the urging surface 163 contacts the reaction force generating mechanism 60, and the urging portion 162 is supported by the reaction force generating mechanism 60. That is, a gap is not formed between the urging surface 163 and the reaction force generating mechanism 60 when the pedal portion 12 is not pressed by the driver.

The reaction force generating mechanism 60 of the present embodiment includes: a coupler 66, which couples between the first resilient member 71 and the second resilient member 72; and the first resiliency support portion 64, in addition to the first resilient member 71 and the second resilient member 72. The reaction force generating mechanism 60 applies the reaction force against the pedal force applied from the driver to the pedal 10 by resiliently deforming the first resilient member 71 and the second resilient member 72 by the pedal force applied from the driver to the pedal 10. Furthermore, the reaction force generating mechanism 60 restores the pedal 10 to the initial pedal position by restoring the shapes of the first resilient member 71 and the second resilient member 72, which have been resiliently deformed, when the brake operation by the driver is released.

The coupler 66 is a member that supports the first resilient member 71 and the second resilient member 72. Specifically, the coupler 66 supports the rear part of the first resilient member 71 facing the vehicle rear side and also supports the front part of the second resilient member 72 facing the vehicle front side. The coupler 66 is placed at a position where the coupler 66 is opposed to the first resiliency support portion 64 in the vehicle front-rear direction Da. The coupler 66 cooperates with the first resiliency support portion 64 to clamp the second resilient member 72 between the coupler 66 and the first resiliency support portion 64. The coupler 66 includes a small diameter coupling portion 661 and a large diameter coupling portion 662. The coupler 66 serves as a clamping portion.

The small diameter coupling portion 661 is shaped in a bottomed cylindrical tubular form having a bottom and an opening, and the bottom of the small diameter coupling portion 661 faces the vehicle front side, and the opening of the small diameter coupling portion 661 faces the vehicle rear side. An outer diameter of the small diameter coupling portion 661 is slightly smaller than the inner diameter of the first resilient member 71. The small diameter coupling portion 661 is placed in the space formed at the inside of the first resilient member 71 that is the coil spring. A size of the small diameter coupling portion 661, which is measured in the vehicle front-rear direction Da, is slightly smaller than a size of the first resilient member 71, which is measured in the vehicle front-rear direction Da. A portion of the second resilient member 72 is received at an inside of the small diameter coupling portion 661, and the bottom of the small diameter coupling portion 661 supports the front part of the second resilient member 72 which faces the vehicle front side.

The large diameter coupling portion 662 is joined to the opening side of the small diameter coupling portion 661, which is opposite to the bottom of the small diameter coupling portion 661. The large diameter coupling portion 662 is shaped in a thin circular ring form which extends from a rear end of the small diameter coupling portion 661 facing the vehicle rear side toward the outer side of the small diameter coupling portion 661. That is, an outer diameter of the large diameter coupling portion 662 is larger than the outer diameter of the small diameter coupling portion 661. Furthermore, the outer diameter of the large diameter coupling portion 662 is slightly larger than the outer diameter of the first resilient member 71. A surface of the large diameter coupling portion 662, which faces the vehicle front side, supports the rear part of the first resilient member 71 which faces the vehicle rear side. Therefore, the first resilient member 71 is placed in a compressed state between the large diameter coupling portion 662 and the inner surface of the housing tubular portion 44.

Furthermore, the first resiliency support portion 64 of the present embodiment supports the second resilient member 72. Specifically, the first resiliency support portion 64 supports the rear part of the second resilient member 72 which faces the vehicle rear side. The outer diameter of the small diameter support portion 641 of the present embodiment is smaller than the outer diameter of the small diameter support portion 641 of the fourth embodiment. Specifically, the outer diameter of the small diameter support portion 641 is slightly smaller than the inner diameter of the second resilient member 72 which is the coil spring. The small diameter support portion 641 is placed in the space formed at the inside of the second resilient member 72.

A surface of the large diameter support portion 642, which faces the vehicle front side, supports the rear part of the second resilient member 72 which faces the vehicle rear side. Therefore, the second resilient member 72 is placed in the compressed state between the small diameter coupling portion 661 and the large diameter support portion 642. The first resilient member 71 and the second resilient member 72 are coupled with each other through the coupler 66 and the first resiliency support portion 64.

In the pedal device 1, which includes the coupler 66 and the first resiliency support portion 64 described above, in the state where the pedal portion 12 is not pressed by the driver, the urging portion 162 of the pedal 10 is supported by the reaction force generating mechanism 60 such that the urging surface 163 of the urging portion 162 contacts the large diameter support portion 642, as shown in FIG. 16. Specifically, the first resilient member 71 and the second resilient member 72 support the urging portion 162 by bringing the contact surface 616 into contact with the urging surface 163 when the pressing operation by the driver is released. When the pedal portion 12 is pressed by the driver, the lever portion 14 is rotated integrally with the pedal portion 12 about the rotational axis O. Therefore, the force from the pedal portion 12 is transmitted to the second resilient member 72 through the first resiliency support portion 64. Thus, the second resilient member 72 is compressed. That is, the first resiliency support portion 64 and the coupler 66 resiliently deform the second resilient member 72.

The amount of resilient deformation of the second resilient member 72 is increased as the pedal force of the driver is increased. Thereby, the large diameter support portion 642 comes in contact with the large diameter coupling portion 662. Furthermore, the force from the pedal portion 12 is transmitted to the coupler 66 through the first resiliency support portion 64. Therefore, the coupler 66 is moved toward the vehicle front side in the vehicle front-rear direction Da, and thereby the first resilient member 71 is compressed. Furthermore, when the pedal portion 12 is further rotated by the pedal force of the driver, the coupler 66 is further moved toward the vehicle front side in the vehicle front-rear direction Da, and the first resilient member 71 is further compressed. Furthermore, the first resilient member 71 and the second resilient member 72, which are compressed by the pedal force transmitted from the pedal portion 12, generate the reaction force by the restoring forces thereof.

As described above, in the case where the urging surface 163 is in contact with the large diameter support portion 642 at the time when the pedal 10 is placed at the initial pedal position, collision of the urging surface 163 of the lever projection 16 against the large diameter support portion 642 in response to the pressing of the pedal portion 12 by the driver does not occur. Thus, the generation of a collision sound caused by the collision of the urging surface 163 against the large diameter support portion 642 can be avoided. In other words, by configuring the urging surface 163 to always contact the large diameter support portion 642, the generation of the collision sound caused by the collision between the urging surface 163 and the large diameter support portion 642 can be avoided.

The rest of the structure of the present embodiment is the same as that of the fourth embodiment. The pedal device 1 of the present embodiment can achieve the advantages, which are achieved by the common configuration or equivalent configuration that is common to or equivalent to the fourth embodiment described above.

Eighth Embodiment

Next, an eighth embodiment will be described with reference to FIG. 17. In the present embodiment, the shape of the first resiliency support portion 64 and the shape of the coupler 66 differ from those of the seventh embodiment. The rest of the present embodiment is the same as that of the seventh embodiment. Therefore, in the present embodiment, different portions, which are different from those of the seventh embodiment, will be mainly described, and the same portions, which are the same as those of the seventh embodiment, will not be described for the sake of simplicity.

Figure 17:
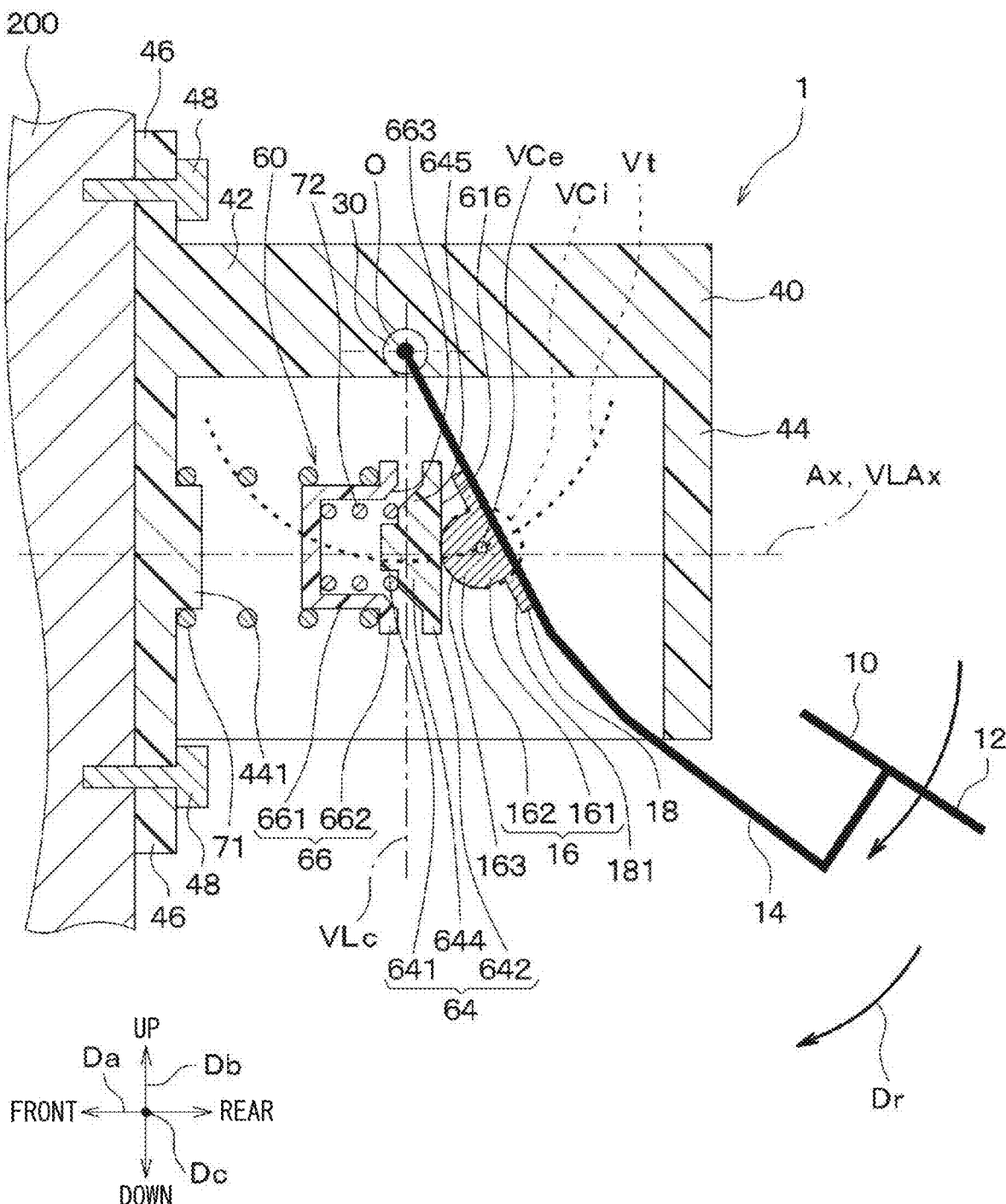
FIG. 17 is a cross-sectional view of a pedal device of an eighth embodiment.

As shown in FIG. 17, the first resiliency support portion 64 of the present embodiment has an intermediate diameter support portion 644 between the small diameter support portion 641 and the large diameter support portion 642. In the first resiliency support portion 64, the small diameter support portion 641, the intermediate diameter support portion 644 and the large diameter support portion 642 are stacked in this order in the vehicle front-rear direction Da. The intermediate diameter support portion 644 is shaped in a circular disk form. The first resiliency support portion 64 is formed such that the small diameter support portion 641, the intermediate diameter support portion 644 and the large diameter support portion 642 have a common central axis.

An outer diameter of the intermediate diameter support portion 644 is larger than the outer diameter of the small diameter support portion 641 and is smaller than the outer diameter of the large diameter support portion 642. The outer diameter of the intermediate diameter support portion 644 is larger than the inner diameter of the second resilient member 72 which is the coil spring. A surface of the intermediate diameter support portion 644, which faces the vehicle front side, supports the rear part of the second resilient member 72 which faces the vehicle rear side. The intermediate diameter support portion 644 has a tapered support portion 645 at an outer periphery of the intermediate diameter support portion 644.

An outer diameter of the tapered support portion 645 is progressively increased from the vehicle front side toward the vehicle rear side. That is, the tapered support portion 645 is shaped in a tapered form. The tapered support portion 645 is opposed to the large diameter coupling portion 662 in the vehicle front-rear direction Da.

The large diameter coupling portion 662 of the present embodiment has a tapered coupling portion 663, which is tapered and is formed at an inner part of the opening of the coupler 66. An inner diameter of the tapered coupling portion 663 is progressively increased from the vehicle front side toward the vehicle rear side. The tapered coupling portion 663 is opposed to the tapered support portion 645 of the intermediate diameter support portion 644 in the vehicle front-rear direction Da.

The shape of the tapered coupling portion 663 corresponds to the shape of the tapered support portion 645 of the intermediate diameter support portion 644. Specifically, the tapered coupling portion 663, which has the inner diameter progressively increasing from the vehicle front side toward the vehicle rear side, has the amount of change in the inner diameter that is substantially the same as the amount of change in the outer diameter of the tapered support portion 645 of the intermediate diameter support portion 644, which has the outer diameter that is progressively increased from the vehicle front side toward the vehicle rear side. The tapered support portion 645 and the tapered coupling portion 663 are formed such that a predetermined distance is ensured between the tapered support portion 645 and the tapered coupling portion 663 when the pedal 10 is placed in the initial pedal position. The tapered support portion 645 formed in the above-described manner serves as a one-side opposing portion that is opposed to the tapered coupling portion 663 in the vehicle front-rear direction Da. The tapered coupling portion 663 serves as an other-side opposing portion that is opposed to the tapered support portion 645 in the vehicle front-rear direction Da.

The reason for forming the tapered support portion 645 on the intermediate diameter support portion 644 and the tapered coupling portion 663 on the large diameter coupling portion 662 will now be explained.

When the pedal portion 12 is rotated by the pedal force of the driver from the contact start position in the pedal rotational direction Dr, the first resiliency support portion 64 is moved toward the vehicle front side in the vehicle front-rear direction Da. Then, the second resilient member 72 is compressed by the first resiliency support portion 64. The tapered support portion 645 is progressively moved toward the tapered coupling portion 663 when the first resiliency support portion 64 is progressively moved toward the vehicle front side in the vehicle front-rear direction Da. Thereby, the distance between the tapered support portion 645 and the tapered coupling portion 663 is progressively reduced.

Figure 18:
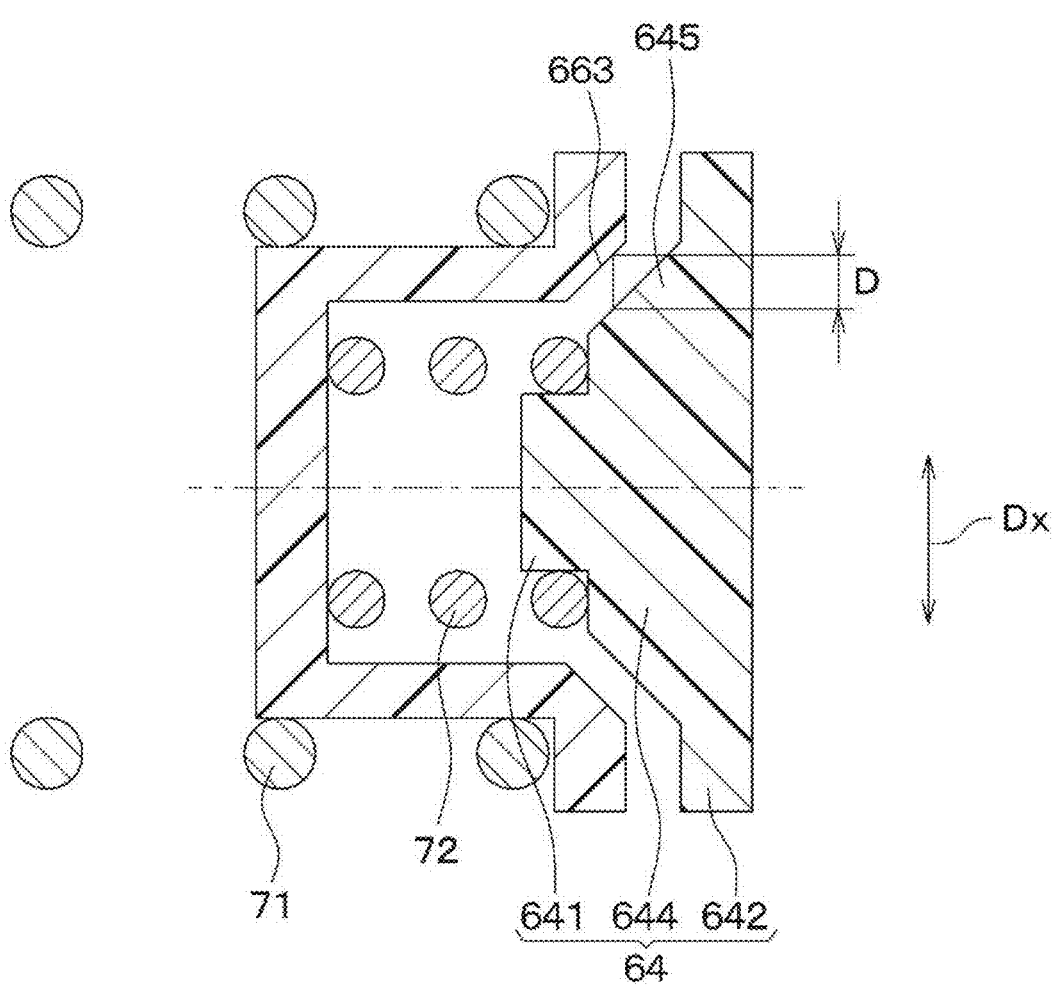
FIG. 18 is a diagram showing a clearance between a tapered support portion and a tapered coupling portion according to the eighth embodiment.

Here, as shown in FIG. 18, at the small diameter support portion 641, the intermediate diameter support portion 644 and the large diameter support portion 642, which are coaxial and thereby have a common central axis, a radiating direction, which radiate from the central axis of the small diameter support portion 641, the intermediate diameter support portion 644 and the large diameter support portion 642, is defined as a support radial direction Dx. The support radial direction Dx is an intersecting direction that intersects the vehicle front-rear direction Da. In other words, the support radial direction Dx is the intersecting direction that intersects the extending direction of the central axis Ax.

The distance between the tapered support portion 645 and the tapered coupling portion 663 in the support radial direction Dx is progressively reduced as the first resiliency support portion 64 is moved toward the vehicle front side to progressively move the tapered support portion 645 toward the tapered coupling portion 663. In other words, a clearance D between the tapered support portion 645 and the tapered coupling portion 663 in the support radial direction Dx is progressively reduced as the first resiliency support portion 64 is moved toward the vehicle front side, as shown in FIG. 18.

Therefore, when the second resilient member 72 is compressed by the first resiliency support portion 64, which is moved toward the vehicle front side, the tapered support portion 645 abuts against the tapered coupling portion 663 even if the second resilient member 72 is flexed in the support radial direction Dx. Thus, the second resilient member 72 is less likely to be flexed in the support radial direction Dx. Thereby, it is easier to compress the second resilient member 72 in the vehicle front-rear direction Da, making it easier to obtain the reaction force corresponding to the pedal force of the driver.

Ninth Embodiment

Next, a ninth embodiment will be described with reference to FIG. 19. In the present embodiment, the location of the tapered support portion 645, which is formed at the first resiliency support portion 64, and the location of the tapered coupling portion 663, which is formed at the coupler 66, are different from those of the eighth embodiment. Furthermore, the shape of the tapered support portion 645 and the shape of the tapered coupling portion 663 are different from those of the eighth embodiment. The rest of the present embodiment is the same as that of the eighth embodiment. Therefore, in the present embodiment, different portions, which are different from those of the eighth embodiment, will be mainly described, and the same portions, which are the same as those of the eighth embodiment, will not be described for the sake of simplicity.

Figure 19:
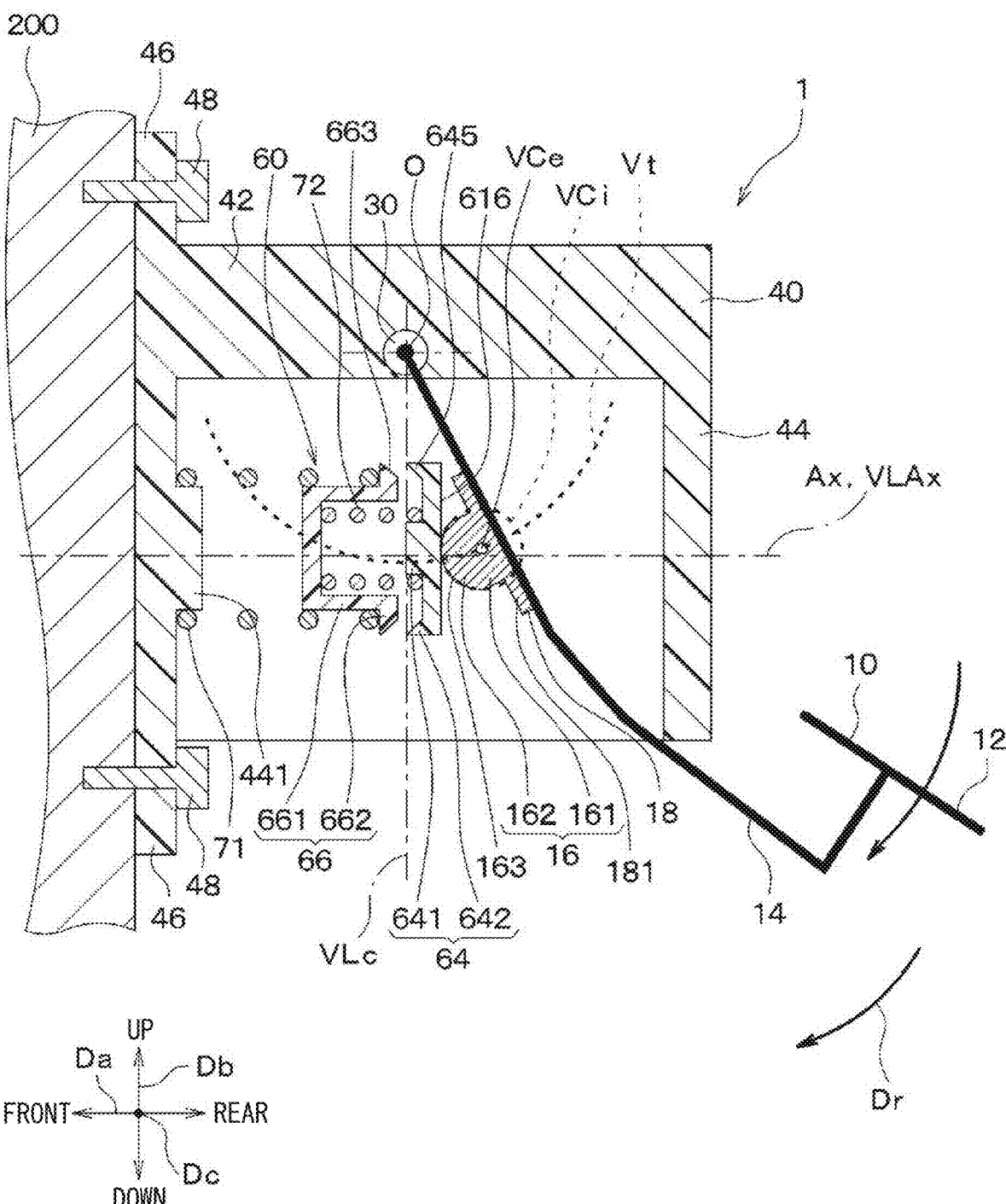
FIG. 19 is a cross-sectional view of a pedal device of a ninth embodiment.

As shown in FIG. 19, the tapered support portion 645 of the present embodiment is formed at an outer periphery of the large diameter support portion 642. Furthermore, an inner diameter of the tapered support portion 645 is progressively reduced from the vehicle front side toward the vehicle rear side. The first resiliency support portion 64 of the present embodiment does not have the intermediate diameter support portion 644, and the surface of the large diameter support portion 642, which faces the vehicle front side, supports the rear part of the second resilient member 72, which faces the vehicle rear side.

Furthermore, the tapered coupling portion 663 of the present embodiment is formed at an outer periphery of the large diameter coupling portion 662. Furthermore, an outer diameter of the tapered coupling portion 663 is progressively reduced from the vehicle front side toward the vehicle rear side. The tapered coupling portion 663 is opposed to the tapered support portion 645 in the vehicle front-rear direction Da.

With the above-described configuration, like in the eighth embodiment, the distance between the tapered support portion 645 and the tapered coupling portion 663 in the support radial direction Dx is progressively reduced as the first resiliency support portion 64 is moved toward the vehicle front side to progressively move the tapered support portion 645 toward the tapered coupling portion 663. In other words, the clearance D between the tapered support portion 645 and the tapered coupling portion 663 in the support radial direction Dx is progressively reduced as the first resiliency support portion 64 is moved toward the vehicle front side.

Therefore, when the second resilient member 72 is compressed by the first resiliency support portion 64, which is moved toward the vehicle front side, the tapered support portion 645 abuts against the tapered coupling portion 663 even if the second resilient member 72 is flexed in the support radial direction Dx. Thus, the second resilient member 72 is less likely to be flexed in the support radial direction Dx. Thereby, it is easier to compress the second resilient member 72 in the vehicle front-rear direction Da, making it easier to obtain the reaction force corresponding to the pedal force of the driver.

Tenth Embodiment

Next, a tenth embodiment will be described with reference to FIG. 20. In the present embodiment, the shape of the first resiliency support portion 64 is different from that of the seventh embodiment, and the second resilient member 72 is different from that of the seventh embodiment. The rest of the present embodiment is the same as that of the seventh embodiment. Therefore, in the present embodiment, different portions, which are different from those of the seventh embodiment, will be mainly described, and the same portions, which are the same as those of the seventh embodiment, will not be described for the sake of simplicity.

Figure 20:
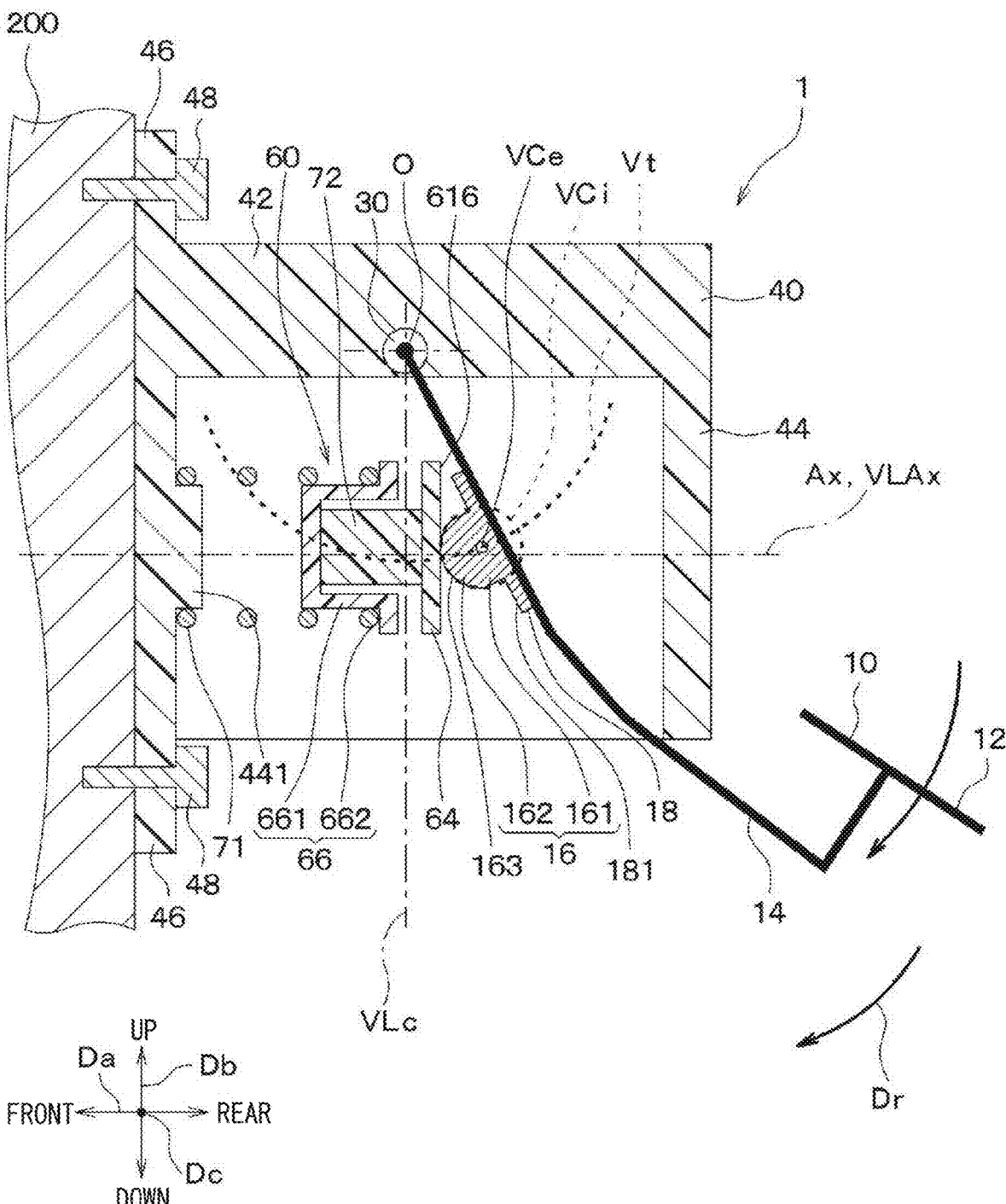
FIG. 20 is a cross-sectional view of a pedal device of a tenth embodiment.

As shown in FIG. 20, the first resiliency support portion 64 of the present embodiment does not have the small diameter support portion 641. Furthermore, the structure of the second resilient member 72 of the present embodiment is different. Specifically, the second resilient member 72 of the present embodiment is formed by a polymer compound having resiliency (elasticity), such as rubber or elastomer.

Thus, by forming the second resilient member 72 by the polymer compound having the resiliency, such as the rubber or the elastomer, the first resilient member 71, which is formed by the coil spring, can be easily damped when the first resilient member 71 is restored from the compressed state. This allows hysteresis in the reaction force against the pedal force of the pedal 10 to improve the feeling of the operation and the quality of the pedal 10 by attenuating vibration and sound.

The rest of the structure of the present embodiment is the same as that of the seventh embodiment. The pedal device 1 of the present embodiment can achieve the advantages, which are achieved by the common configuration or equivalent configuration that is common to or equivalent to the seventh embodiment described above.

Eleventh Embodiment

Next, an eleventh embodiment will be described with reference to FIG. 21. The present embodiment differs from the first embodiment in that the guide member 63 of the reaction force generating mechanism 60 is eliminated, and the shape of the holder 61 and the shape of the housing tubular portion 44 are partially changed from those of the first embodiment. Furthermore, in the present embodiment, the first resilient member 71 differs from that of the first embodiment. The rest of the present embodiment is the same as that of the first embodiment. Therefore, in the present embodiment, different portions, which are different from those of the first embodiment, will be mainly described, and the same portions, which are the same as those of the first embodiment, will not be described for the sake of simplicity.

Figure 21:
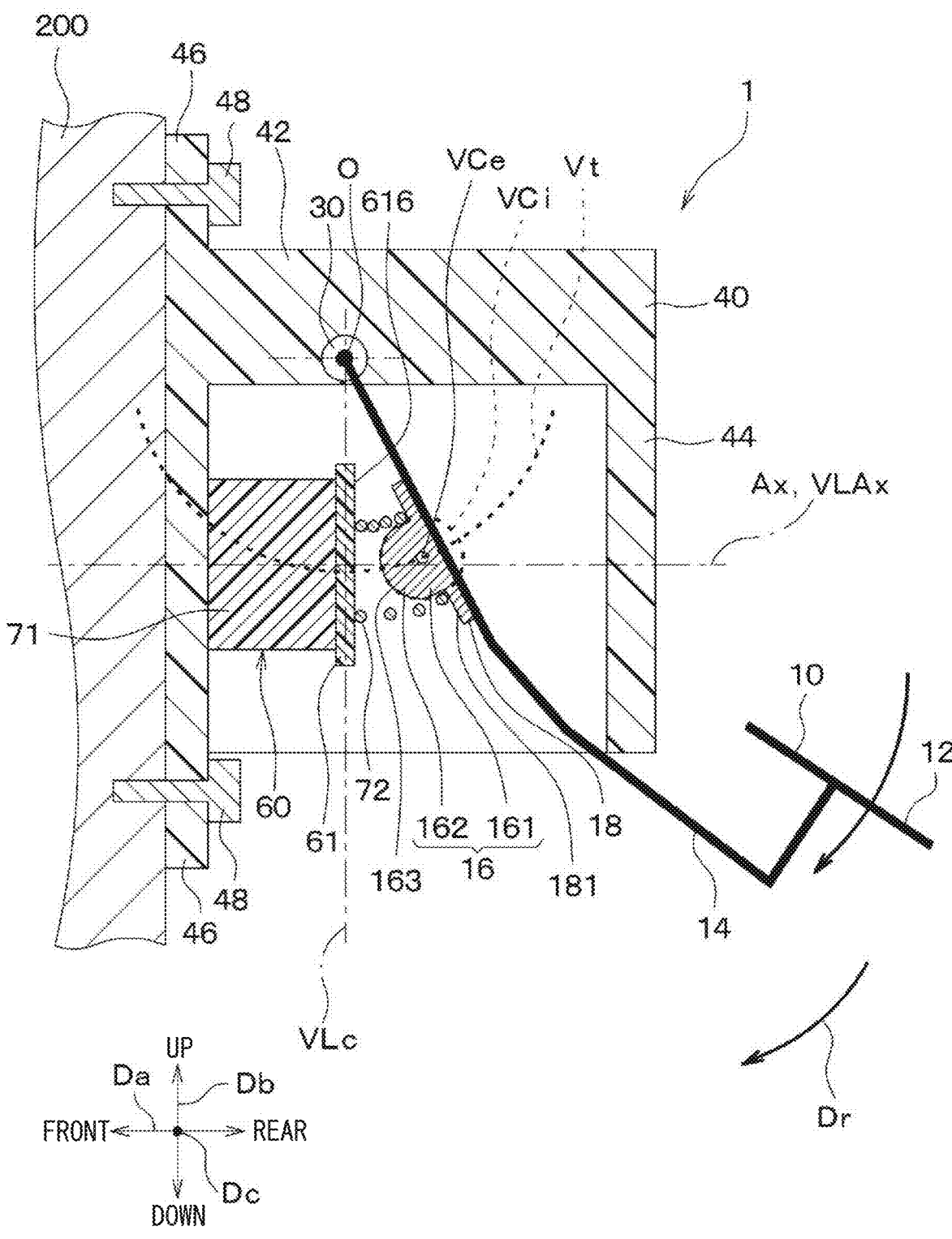
FIG. 21 is a cross-sectional view of a pedal device of an eleventh embodiment.

As shown in FIG. 21, the guide member 63 is eliminated as compared to the first embodiment. Furthermore, the guide portion 614 is eliminated from the holder 61 as compared to the first embodiment. Furthermore, the size of the housing tubular portion 44 of the present embodiment, which is measured in the vehicle front-rear direction Da, is reduced as compared to the first embodiment. Furthermore, the distance between the inner surface of the housing tubular portion 44 and the support portion 610 of the holder 61, which is measured in the vehicle front-rear direction Da, is reduced as compared to the first embodiment. The first resilient member 71 is placed in a compressed state between the inner surface of the housing tubular portion 44 and the support portion 610 of the holder 61.

Furthermore, the structure of the first resilient member 71 of the present embodiment is different. Specifically, the first resilient member 71 of the present embodiment is formed by a polymer compound having resiliency (elasticity), such as rubber or elastomer. The size of the first resilient member 71 of the present embodiment, which is measured in the vehicle front-rear direction Da, is reduced in comparison to the first embodiment.

Thus, by forming the first resilient member 71 from the polymer compound having the resiliency, such as the rubber or the elastomer, it is easier to obtain the same resilient force as the coil spring even if the size of the first resilient member 71 measured in the vehicle front-rear direction Da is reduced compared to the case where the first resilient member 71 is formed by the coil spring. Therefore, as compared to the case where the first resilient member 71 is formed by the coil spring, the size of the first resilient member 71 measured in the vehicle front-rear direction Da can be reduced, and the size of the housing tubular portion 44 measured in the vehicle front-rear direction Da can be reduced.

Furthermore, by forming the first resilient member 71 from the polymer compound having the resiliency, such as the rubber or the elastomer, the second resilient member 72, which is formed by the coil spring, can be easily damped when the second resilient member 72 is restored from the compressed state. This allows hysteresis in the reaction force against the pedal force of the pedal 10 to improve the feeling of the operation and the quality of the pedal 10 by attenuating vibration and sound.

The rest of the structure of the present embodiment is the same as that of the seventh embodiment. The pedal device 1 of the present embodiment can achieve the advantages, which are achieved by the common configuration or equivalent configuration that is common to or equivalent to the seventh embodiment described above.

Other Embodiments

Although the representative embodiments of the present disclosure have been described above, the present disclosure is not limited to the above-described embodiments and can be variously modified, for example, as follows.

Figure 22:
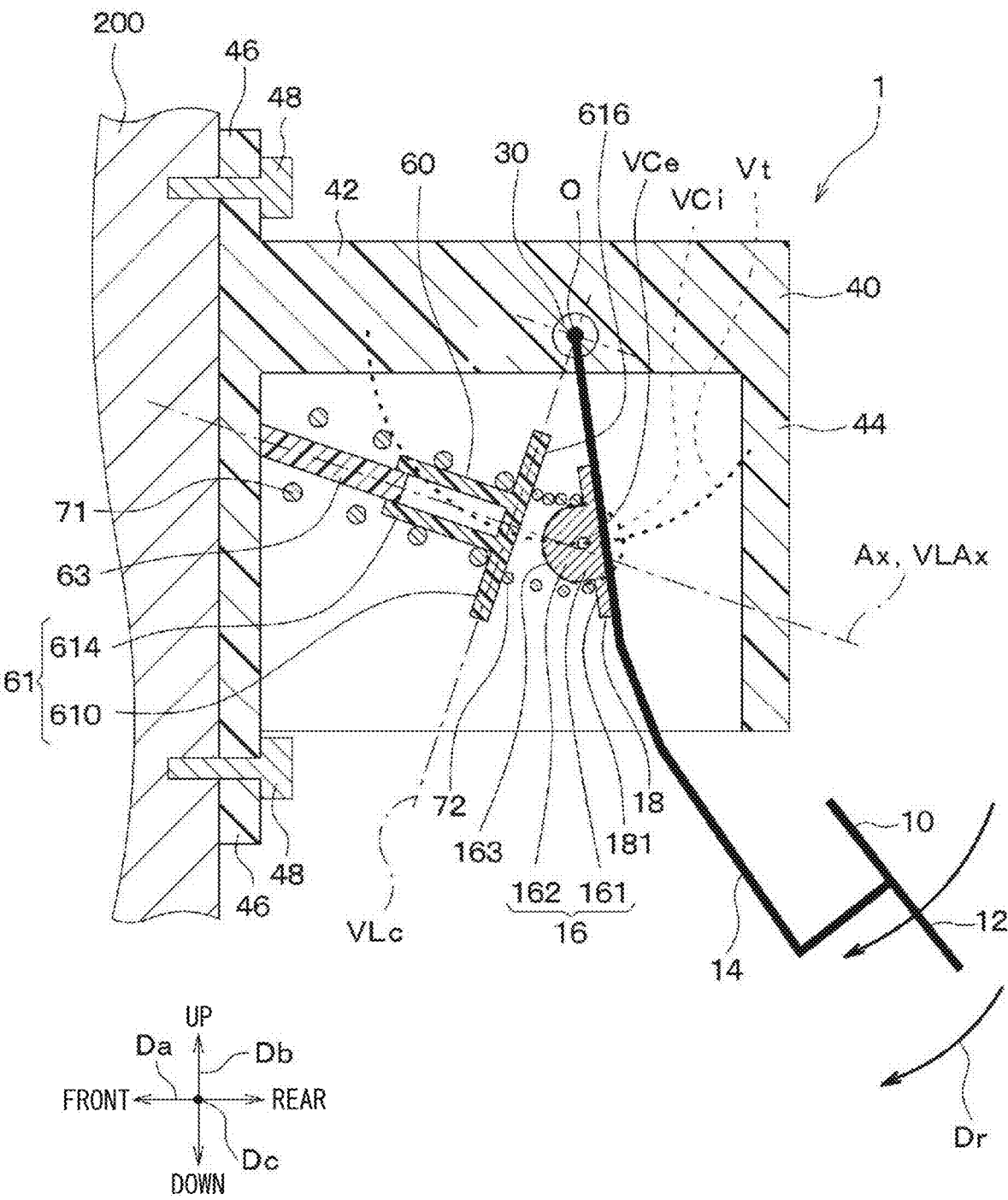
FIG. 22 is a cross-sectional view of a pedal device of another embodiment.

In the embodiments described above, there is described the example in which the central axis Ax of the guide member 63 extends in the vehicle front-rear direction Da, and the holder 61 is moved in the vehicle front-rear direction Da. However, the present disclosure is not limited to this. For example, the central axis Ax of the guide member 63 may be inclined relative to the vehicle front-rear direction Da, as shown in FIG. 22. Then, the holder 61 may be configured to move in the extending direction of the central axis Ax of the guide member 63.

In the embodiments described above, there is described the example in which the reaction force generating mechanism 60 includes the plurality of resilient members. However, the present disclosure is not limited to this. For example, the reaction force generating mechanism 60 may include only one resilient member or three or more resilient members.

In the embodiments described above, there is described the example in which the first resilient member 71 and the second resilient member 72 of the reaction force generating mechanism 60 are arranged in series. However, the present disclosure is not limited to this. For example, the first resilient member 71 and the second resilient member 72 may be arranged in parallel.

In the first to sixth and eleventh embodiments described above, the second resilient member 72 is placed between the pedal 10 and the holder 61 and forms the predetermined size of the gap between the contact surface 616 and the urging surface 163 at the time of releasing the pressing operation of the pedal 10. However, the present disclosure is not limited to this. For example, it may be configured such that the second resilient member 72 is not placed between the pedal 10 and the holder 61. Then, at the time of releasing the pressing operation of the pedal 10, the predetermined size of the gap may not be formed between the contact surface 616 and the urging surface 163, and the contact surface 616 and the urging surface 163 may contact each other.

In the embodiments described above, there is described the example in which at the time of rotating the pedal 10 within the contact range in which the urging surface 163 and the contact surface 616 are kept in contact with each other, the pedal 10 is rotatable up to the same angle (identical angle) toward the one side and also toward the other side with reference to the virtual axis perpendicular line VLc. However, the present disclosure is not limited to this. For example, at the time of rotating the pedal 10 within the contact range in which the urging surface 163 and the contact surface 616 are kept in contact with each other, the pedal 10 may be configured to be rotatable up to two different angles toward the one side and toward the other side, respectively, with reference to the virtual axis perpendicular line VLc.

In the first embodiment described above, there is described the example in which at the time when the pedal 10 is rotated to the angle θ1 with reference to the virtual axis perpendicular line VLc, and at the time when the pedal 10 is rotated to the angle θ2 with reference to the virtual axis perpendicular line VLc, the part of the urging surface 163, which contacts the contact surface 616, is positioned on the virtual axial line VLAx. However, the present disclosure is not limited to this. For example, at the time when the pedal 10 is rotated to the angle θ1 with reference to the virtual axis perpendicular line VLc, and at the time when the pedal 10 is rotated to the angle θ2 with reference to the virtual axis perpendicular line VLc, the part of the urging surface 163, which contacts the contact surface 616, may not be positioned on the virtual axial line VLAx.

In the first embodiment described above, there is described the example in which at the time when the pedal 10 is rotated to the angle θ2 toward the one side, the support surface 181 and the contact surface 616 are opposed to each other. However, the present disclosure is not limited to this. For example, at the time when the pedal 10 is rotated to the angle θ2 toward the one side, the support surface 181 and the contact surface 616 may not be opposed to each other.

In the second embodiment described above, there is described the example in which the support surface 181 and the contact surface 616 are opposed to each other when the pedal 10 is rotated to the position where the virtual urging center VCe overlaps the virtual axis perpendicular line VLc. However, the present disclosure is not limited to this. For example, the support surface 181 and the contact surface 616 may not be opposed to each other when the pedal 10 is rotated to the position where the virtual urging center VCe overlaps the virtual axis perpendicular line VLc.

In the embodiments described above, there is described the example in which the pedal device 1 is used as the brake pedal used for the brake operation. However, the present disclosure is not limited to this. For example, the pedal device 1 may be used as an accelerator pedal used for accelerating operation.

In the embodiments described above, the first resilient member 71 and the second resilient member 72 are formed by the coil spring or the polymer compound having the resiliency, such as the rubber or the elastomer. However, the present disclosure is not limited to this. For example, the first resilient member 71 and the second resilient member 72 may be formed by another type of resilient material which is different from the coil spring or the polymer compound having the resiliency, such as the rubber or the elastomer.

In the embodiments described above, the reaction force is generated by the restoring forces generated by the compression of the first resilient member 71 and the second resilient member 72. However, the present disclosure is not limited to this. For example, the arrangement of the reaction force generating mechanism 60 may be changed such that the reaction force is generated by a restoring force(s) generated by expanding (pulling) of the first resilient member 71 and the second resilient member 72. Each of the coil spring of the first resilient member 71 and the coil spring of the second resilient member 72 is an equally spaced coil spring. However, the present disclosure is not limited to this. For example, each of the coil spring of the first resilient member 71 and the coil spring of the second resilient member 72 may be a conical coil spring or an unequally spaced coil spring.

In each embodiment described above, the pedal device 1 is a pendant type device. However, the present disclosure is not limited to this. The pedal device 1 may be an organ type device. In the case of the organ type, in response to an increase in the pedal force of the driver applied to the pedal 10, a portion of the pedal 10, which is located on the vehicle front side of the rotational axis O, is rotated toward the dash panel 200.

In each embodiment described above, in the brake-by-wire system 150, the master cylinder 126 generates the hydraulic pressure in the brake fluid flowing through the brake circuit 120. The configuration is not limited to the master cylinder 126 generating the hydraulic pressure in the brake fluid flowing through the brake circuit 120. For example, a hydraulic pump may generate the hydraulic pressure in the brake fluid flowing through the brake circuit 120.

Needless to say, in the above-described embodiments, the components of the embodiment(s) are not necessarily essential except when it is clearly indicated that they are essential and when they are clearly considered to be essential in principle.

In the above-described embodiments, when the numerical values, such as the number, numerical value, quantity, range, etc. of the components of the embodiment(s) are mentioned, the numerical values are not limited to those described in the embodiment(s) except when it is clearly indicated that the numeric values are essential and when the numeric values are clearly considered to be essential in principle.

In the above-described embodiments, when a shape, a positional relationship, etc. of the component(s) is mentioned, the shape, positional relationship, etc. are not limited to those described in the embodiment(s) unless otherwise specified or limited in principle to the those described in the embodiment(s).

(Characteristics of Present Disclosure)

(First Aspect)

According to a first aspect of the present disclosure, there is provided a pedal device including:

a housing;

a pedal that is installed to the housing and is configured to rotate about a rotational axis within a predetermined rotational range in response to pressing operation of the pedal by a human driver; and a reaction force generator that is configured to generate a reaction force which corresponds to an urging force generated by the pressing operation of the pedal, wherein:

the pedal includes an urging portion that is configured to transmit the urging force generated by the pressing operation of the pedal to the reaction force generator when the urging portion is rotated integrally with the pedal about the rotational axis;

the reaction force generator includes a linearly moving portion that is configured to move linearly in an extending direction of a central axis of the reaction force generator when the pressing operation of the pedal is performed;

the linearly moving portion has a contact surface that is configured to contact the urging portion;

the urging portion has an urging surface that is configured to urge the contact surface;

a virtual circle is defined to extend along the urging surface, and a center of the virtual circle is defined as a virtual urging center;

a line, which passes through the rotational axis and is perpendicular to the extending direction of the central axis, is defined as a virtual axis perpendicular line; and the urging portion is placed at a position where the virtual urging center passes through the virtual axis perpendicular line when the pedal is rotated within the predetermined rotational range.

(Second Aspect)

According to a second aspect of the present disclosure, there is provided the pedal device according to the first aspect, wherein:

the reaction force generator includes a guide member that is configured to guide movement of the linearly moving portion in the extending direction of the central axis through sliding of the linearly moving portion along the guide member when the linearly moving portion is moved; and the contact surface is a planar surface that is perpendicular to the extending direction of the central axis.

(Third Aspect)

According to a third aspect of the present disclosure, there is provided the pedal device according to the first or second aspect, wherein the reaction force generator includes a plurality of resilient members that are configured to generate the reaction force when the plurality of resilient members are resiliently deformed by the urging force.

(Fourth Aspect)

According to a fourth aspect of the present disclosure, there is provided the pedal device according to the third aspect, wherein the plurality of resilient members are arranged in series.

(Fifth Aspect)

According to a fifth aspect of the present disclosure, there is provided the pedal device according to the fourth aspect, wherein:

a predetermined resilient member among the plurality of resilient members is placed between the pedal and the linearly moving portion; and the predetermined resilient member is configured to form a predetermined size of a gap between the contact surface and the urging surface when the pressing operation of the pedal is released.

(Sixth Aspect)

According to a sixth aspect of the present disclosure, there is provided the pedal device according to the first or second aspect, wherein:

the reaction force generator includes a plurality of resilient members that are configured to generate the reaction force when the plurality of resilient members are resiliently deformed by the urging force; and the plurality of resilient members are configured to place the contact surface in contact with the urging surface and thereby support the urging portion through the contact surface when the pressing operation of the pedal is released.

(Seventh Aspect)

According to a seventh aspect of the present disclosure, there is provided the pedal device according to the first or second aspect, wherein:

the reaction force generator includes:

a resilient member that is configured to generate the reaction force when the resilient member is resiliently deformed by the urging force; and a clamping portion that is placed at a position where the clamping portion is opposed to the linearly moving portion in the extending direction of the central axis, wherein the clamping portion is configured to clamp and resiliently deform the resilient member in coop-
eration with the linearly moving portion when the
linearly moving portion is moved;
the linearly moving portion has a one-side opposing
portion that is opposed to the clamping portion in the
extending direction of the central axis;
the clamping portion has an other-side opposing portion
that is opposed to the one-side opposing portion of the
linearly moving portion in the extending direction of
the central axis;
a direction, which intersects the extending direction of the
central axis, is defined as an intersecting direction;
the one-side opposing portion and the other-side opposing
portion are configured to oppose each other in the
intersecting direction when the linearly moving portion
is moved; and
a distance between the one-side opposing portion and the
other-side opposing portion in the intersecting direction
is progressively reduced as the linearly moving portion
is moved.
(Eighth Aspect)
According to an eighth aspect of the present disclosure,
there is provided the pedal device according to any one of
the first to seventh aspects, wherein at a time of rotating the
pedal within a contact range in which the urging surface and
the contact surface are kept in contact with each other, the
pedal is rotatable up to a predetermined angle toward one
side with reference to the virtual axis perpendicular line and
is also rotatable up to the predetermined angle toward
another side opposite to the one side with reference to the
virtual axis perpendicular line.
(Ninth Aspect)
According to a ninth aspect of the present disclosure,
there is provided the pedal device according to any one of
the first to eighth aspects, wherein:
a straight line, which extends in the extending direction of
the central axis, is defined as a virtual axial line; and
at a time when the pedal is rotated to the predetermined
angle toward the one side, and also at a time when the
pedal is rotated to the predetermined angle toward the
another side, a part of the urging surface of the urging
portion, which contacts the contact surface, is posi-
tioned on the virtual axial line.
(Tenth Aspect)
According to a tenth aspect of the present disclosure, there
is provided the pedal device according to the ninth aspect,
wherein:
the pedal has a support surface that is configured to
support one part of the predetermined resilient member
which faces one side in a deforming direction of the
predetermined resilient member, wherein the deform-
ing direction is defined as a direction in which the
predetermined resilient member is configured to
deform;
the contact surface is configured to support another part of
the predetermined resilient member which is opposite
to the one part of the predetermined resilient member in
the deforming direction of the predetermined resilient
member; and
the support surface and the contact surface are configured
to oppose each other at the time when the pedal is
rotated to the predetermined angle toward the one side.
(Eleventh Aspect)
According to an eleventh aspect of the present disclosure,
there is provided the pedal device according to any one of
the first to eighth aspects, wherein:

a straight line, which extends in the extending direction of
the central axis, is defined as a virtual axial line;
a trajectory, along which the virtual urging center passes
when the pedal is rotated within the predetermined
rotational range, is defined as a center trajectory; and
the urging portion is placed at a position where the virtual
axial line becomes a tangent line that is tangent to the
center trajectory.
(Twelfth Aspect)
According to a twelfth aspect of the present disclosure,
there is provided the pedal device according to the ninth
aspect, wherein:
the pedal has a support surface that is configured to
support one part of the predetermined resilient member
which faces one side in a deforming direction of the
predetermined resilient member, wherein the deform-
ing direction is defined as a direction in which the
predetermined resilient member is configured to
deform;
the contact surface is configured to support another part of
the predetermined resilient member which is opposite
to the one part of the predetermined resilient member in
the deforming direction of the predetermined resilient
member; and the support surface and the contact sur-
face are configured to oppose each other when the
virtual urging center is placed at a position where the
virtual urging center overlaps the virtual axial line.
(Thirteenth Aspect)
According to a thirteenth aspect of the present disclosure,
there is provided the pedal device according to any one of
the third to twelfth aspects, wherein the resilient member
include at least one of rubber and a coil spring.

What is claimed is:
1. A pedal device comprising:
a housing;
a pedal that is installed to the housing and is configured
to rotate about a rotational axis within a predetermined
rotational range in response to pressing operation of the
pedal through a pedal portion of the pedal by a human
driver; and
a reaction force generator that is disposed on the housing
at a position between the rotational axis and the pedal
portion in a longitudinal direction of the pedal and is
configured to generate a reaction force which corre-
sponds to an urging force generated by the pressing
operation of the pedal, wherein:
the pedal includes an urging portion that is configured to
transmit the urging force generated by the pressing
operation of the pedal to the reaction force generator
when the urging portion is rotated integrally with the
pedal about the rotational axis;
the reaction force generator includes;
a linearly moving portion that is configured to move
linearly in an extending direction of a central axis of
the reaction force generator when the pressing opera-
tion of the pedal is performed;
a coupler that is disposed to face the linearly moving
portion in the extending direction of the central axis;
a first resilient member that is a single resilient member
disposed between the coupler and the housing; and
a second resilient member that is disposed between the
linearly moving portion and the coupler;
the linearly moving portion has a contact surface that is
configured to contact the urging portion;

the urging portion has an urging surface that faces a side opposite to the pedal portion in the extending direction of the central axis and is configured to urge the contact surface;

a virtual circle is defined to extend along the urging surface, and a center of the virtual circle is defined as a virtual urging center;

a line, which passes through the rotational axis and is perpendicular to the extending direction of the central axis, is defined as a virtual axis perpendicular line; and the urging portion is placed at a position where the virtual urging center passes through the virtual axis perpendicular line when the pedal is rotated within the predetermined rotational range;

when the pedal is placed in an initial position before being pressed by the human driver, an axial extent of the linearly moving portion is entirely displaced from an axial extent of the coupler in the extending direction of the central axis;

when the urging portion is rotated integrally with the pedal in response to depression of the pedal, the urging portion urges the linearly moving portion so that the linearly moving portion compresses the second resilient member while movement of the coupler in response to an urging force transmitted to the coupler via the second resilient member is restricted by the first resilient member until the second resilient member is compressed by a predetermined amount; and when the second resilient member is compressed beyond the predetermined amount, the coupler moves together with the linearly moving portion in the extending direction of the central axis to compress the first resilient member.

2. The pedal device according to claim 1, wherein:

the coupler is configured to clamp and resiliently deform the second resilient member in cooperation with the linearly moving portion when the linearly moving portion is moved;

the linearly moving portion has a one-side opposing portion that is opposed to the coupler in the extending direction of the central axis;

the coupler has an other-side opposing portion that is opposed to the one-side opposing portion of the linearly moving portion in the extending direction of the central axis;

a direction, which intersects the extending direction of the central axis, is defined as an intersecting direction;

the one-side opposing portion and the other-side opposing portion are configured to oppose each other in the intersecting direction when the linearly moving portion is moved; and a distance between the one-side opposing portion and the other-side opposing portion in the intersecting direction is progressively reduced as the linearly moving portion is moved.

3. The pedal device according to claim 1, wherein at a time of rotating the pedal within a contact range in which the urging surface and the contact surface are kept in contact with each other, the pedal is rotatable up to a predetermined angle toward one side with reference to the virtual axis perpendicular line and is also rotatable up to the predetermined angle toward another side opposite to the one side with reference to the virtual axis perpendicular line.

4. The pedal device according to claim 3, wherein:

a straight line, which extends in the extending direction of the central axis, is defined as a virtual axial line; and at a time when the pedal is rotated to the predetermined angle toward the one side, and also at a time when the pedal is rotated to the predetermined angle toward the another side, a part of the urging surface of the urging portion, which contacts the contact surface, is positioned on the virtual axial line.

5. The pedal device according to claim 3, wherein:

a straight line, which extends in the extending direction of the central axis, is defined as a virtual axial line;

a trajectory, along which the virtual urging center passes when the pedal is rotated within the predetermined rotational range, is defined as a center trajectory; and the urging portion is placed at a position where the virtual axial line becomes a tangent line that is tangent to the center trajectory.

6. The pedal device according to claim 1, wherein each of the first resilient member and the second resilient member is rubber or a coil spring.

* * * * *